(12) United States Patent
Shoji et al.

(10) Patent No.: US 7,898,916 B2
(45) Date of Patent: Mar. 1, 2011

(54) RECORDING POWER DETERMINATION METHOD AND DEVICE

(75) Inventors: Mamoru Shoji, Sakai (JP); Yasumori Hino, Ikoma (JP); Takahiro Sato, Mino (JP); Yuu Okada, Moriguchi (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/623,681

(22) Filed: Nov. 23, 2009

(65) Prior Publication Data

US 2010/0067337 A1 Mar. 18, 2010

Related U.S. Application Data

(63) Continuation of application No. 11/369,117, filed on Mar. 6, 2006, now Pat. No. 7,668,055, which is a continuation of application No. PCT/JP2005/001140, filed on Jan. 27, 2005.

(30) Foreign Application Priority Data

| Jan. 28, 2004 | (JP) | ............................ 2004-019582 |
| Mar. 2, 2004 | (JP) | ............................ 2004-057198 |
| Jul. 15, 2004 | (JP) | ............................ 2004-208135 |

(51) Int. Cl.
  *G11B 7/00* (2006.01)
(52) U.S. Cl. .................................................. 369/47.53
(58) Field of Classification Search ..... 369/47.5–47.53, 369/53.26, 116
See application file for complete search history.

(56) References Cited

U.S. PATENT DOCUMENTS

| 5,226,027 A | * | 7/1993 | Bakx ........................ 369/47.55 |
| 5,303,217 A | * | 4/1994 | Bakx et al. ................ 369/47.53 |
| 5,592,452 A | * | 1/1997 | Yoshimoto et al. ........ 369/53.21 |

(Continued)

FOREIGN PATENT DOCUMENTS

EP 1197959 4/2002

(Continued)

OTHER PUBLICATIONS

International Search Report for corresponding Application No. PCT/JP2005/001140 mailed May 17, 2005.

(Continued)

*Primary Examiner*—Thang V Tran
(74) *Attorney, Agent, or Firm*—Renner, Otto, Boisselle & Sklar, LLP

(57) ABSTRACT

A recording power determination method for determining a recording power of an optical beam for recording data on an information storage medium includes the steps of recording test data on the information storage medium at a plurality of test recording powers; reading the test data recorded at each test recording power, generating a signal, and measuring a modulation factor of the signal corresponding to each test recording power; calculating a product of an n'th power of each test recording power and the corresponding modulation factor, thereby obtaining a plurality of products corresponding to the plurality of test recording powers, where n is a value of exponent and is a real number other than 1; calculating a first recording power based on the correlation between the plurality of test recording powers and the plurality of products; and calculating the recording power based on the first recording power.

1 Claim, 16 Drawing Sheets

U.S. PATENT DOCUMENTS

| | | | |
|---|---|---|---|
| 5,740,149 | A | 4/1998 | Iwasaki et al. |
| 5,793,737 | A * | 8/1998 | Den Boef ................ 369/47.53 |
| 5,872,763 | A * | 2/1999 | Osakabe ................. 369/47.53 |
| 6,359,846 | B1 | 3/2002 | Shoji et al. |
| 6,538,968 | B1 | 3/2003 | Yamaguchi et al. |
| 6,621,780 | B2 * | 9/2003 | Suzuki .................... 369/47.53 |
| 6,711,108 | B2 | 3/2004 | Mashimo et al. |
| 6,778,478 | B2 * | 8/2004 | Mashimo et al. ......... 369/47.53 |
| 7,099,249 | B2 | 8/2006 | Hsu et al. |
| 7,123,563 | B2 | 10/2006 | Mimnagh et al. |
| 2001/0033534 | A1 | 10/2001 | Takeda et al. |
| 2002/0101806 | A1 | 8/2002 | Miyaki |
| 2002/0150013 | A1 | 10/2002 | Hsiao |
| 2003/0039188 | A1 | 2/2003 | Fukuchi et al. |
| 2003/0169659 | A1 | 9/2003 | Miyaki |
| 2005/0163008 | A1 | 7/2005 | Mamiya et al. |

FOREIGN PATENT DOCUMENTS

| | | |
|---|---|---|
| EP | 1324321 | 7/2003 |
| EP | 1 365 392 | 11/2003 |
| JP | 2003-099933 | 4/2003 |
| JP | 2005-149538 A | 6/2005 |
| JP | 2005-209287 | 8/2005 |
| RU | 2 231 135 | 6/2004 |
| WO | 2005/029479 A1 | 3/2005 |

OTHER PUBLICATIONS

Supplementary European Search Report for corresponding application No. 05709414.6 issued Apr. 6, 2009.

Russian Decision on Grant for corresponding Application No. 2006110032 dated May 28, 2009 (with partial English translation).

Co-pending U.S. Appl. No. 11/369,117 filed on Mar. 6, 2006 (allowed claims provided).

* cited by examiner

TRACK 301

OPTICAL DISC 101

MODULATION FACTOR

RECORDING POWER

RECORDING POWER

MODULATION FACTOR

TEST RECORDING POWER

TEST RECORDING POWER

SIGNAL LEVEL WHEN NO OPTICAL BEAM IS EMITTED FROM THE LASER

FIG.21  CONVENTIONAL
MODULATION FACTOR
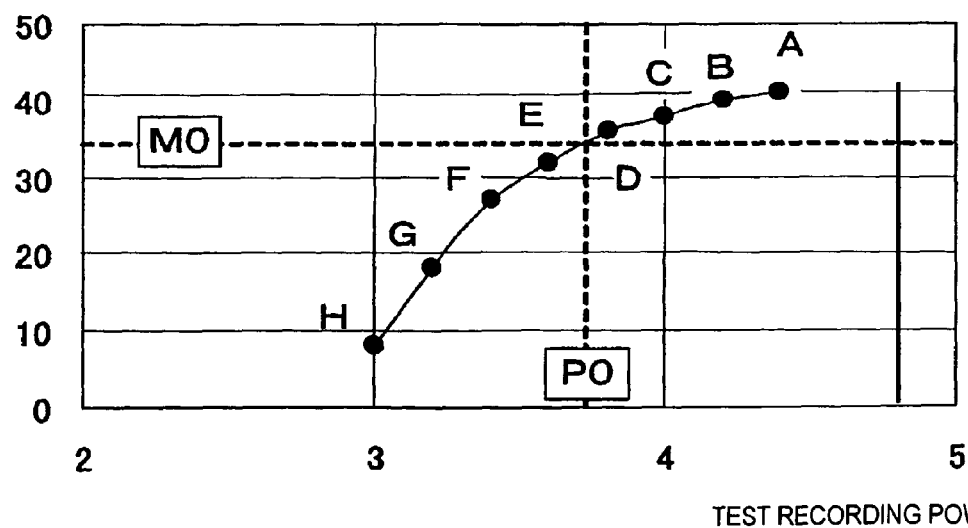
TEST RECORDING POWER

TEST RECORDING POWER

MODULATION FACTOR

RECORDING POWER

I
RECORDING POWER DETERMINATION METHOD AND DEVICE

This is a continuation application of U.S. application Ser. No. 11/369,117 filed on Mar. 6, 2006, now U.S. Pat. No. 7,668,055 which is a continuation of International Application PCT/JP2005/001140, with an international filing date of Jan. 27, 2005, the entire contents of which are expressly incorporated by reference herein.

BACKGROUND OF THE INVENTION

1. Field of the Invention

The present invention relates to a recording power determination method and a recording power determination device for determining a recording power for recording data on an information storage medium.

2. Description of the Related Art

Optical discs are known as information storage mediums for data recording. An optical disc apparatus irradiates an optical disc with an optical beam to record data or to reproduce data recorded on the optical disc. Even if optical discs and optical disc apparatuses are produced in the same manner, there are individual differences among the optical discs and the optical disc apparatuses. Due to the individual differences, there may occur a problem that data cannot be properly recorded on an optical disc or data recorded on an optical disc cannot be properly reproduced.

As one method for preventing such a problem, it is known to determine a recording power which is appropriate for an individual optical disc and an individual optical disc apparatus when, for example, mounting an optical disc.

FIG. 16 is a schematic view showing a general optical disc 601. As shown in FIG. 16, the optical disc 601 has a track 602 formed therein spirally. By irradiating the track 602 with an optical beam having a modified recording power, a plurality of marks and a plurality of spaces are formed on the track 602. Thus, data is recorded. The optical disc 601 includes a user data area used for data recording by the user and a recording power determination area used for determining a recording power of the optical beam. The recording power determination area is provided in an area other than the user data area (specifically, an innermost area or an outermost area of the optical disc 601).

FIG. 17 is a schematic view showing a conventional optical disc apparatus 700. The optical disc apparatus 700 includes an optical head 702, a reproduction section 704, a demodulation/ECC (Error Correcting Code) circuit 706, a recording power determination section 708, a recording power setting section 710, a laser driving circuit 712, and a recording data generation section 714.

When the optical disc 601 is mounted on the optical disc apparatus 700, the type of the optical disc 601 is identified, and the optical disc 601 is rotated. The optical head 702 has a semiconductor laser (not shown). While being rotated, the optical disc 601 is irradiated with an optical beam emitted from the semiconductor laser of the optical head 702.

For recording data on the optical disc 601, the optical head 702 irradiates the optical disc 601 with an optical beam having a predetermined recording power to form marks on the optical disc 601. In this example, data of the Run Length Limited (1,7) modulation system is recorded by a mark edge recording method. In this case, seven types of marks and spaces are formed on the optical disc 601 on the basis of reference cycle T, which is 2T at the shortest and 8T at the longest.

For reading data from the optical disc 601, the optical head 702 irradiates the optical disc 601 with an optical beam having a reproduction power which is smaller than the recording power and receives light reflected by the optical disc 601. The optical head 702 performs optical/electric conversion on the received light to generate a signal indicating the data recorded on the optical disc 601. The reproduction section 704 measures a modulation factor of the signal generated by the optical head 702, and digitizes the signal generated by the optical head 702. The modulation factor will be described later with reference to FIG. 19.

The demodulation/ECC circuit 706 demodulates the signal digitized by the reproduction section 704 and corrects errors. The recording power determination section 708 determines the recording power for recording the data based on the modulation factor measured by the reproduction section 704. The recording power setting section 710 sets the recording power determined by the recording power determination section 708 in the laser driving circuit 712. The recording data generation section 714 generates data to be recorded on the optical disc 601. The laser driving circuit 712 drives the optical head 702 to record the data generated by the recording data generation section 714 on the optical disc 601 at the recording power set by the recording power setting section 710.

FIG. 18 is a schematic view showing the reproduction section 704 in the conventional optical disc apparatus 700. As shown in FIG. 18, the reproduction section 704 includes a preamplifier 801, a sampling and holding circuit 802, an A/D converter 803, an arithmetic operator 804, and a binary data generation section 805.

The binary data generation section 805 digitizes the signal generated by the optical disc 702 to generate digitized data (binary data), and outputs a signal 705 indicating the binary data to the demodulation/ECC circuit 706 and the recording power determination section 708.

The preamplifier 801 amplifiers the signal generated by the optical head 702. The sampling and holding circuit 802 samples the signal amplified by the preamplifier 801 and holds the peak value and the bottom value of the signal. The A/D converter 803 digitizes the peak value and the bottom value held by the sampling and holding circuit 802. The arithmetic operator 804 performs an arithmetic operation on the digitized peak value and bottom value to obtain a modulation factor.

FIG. 19 is a schematic view showing a waveform of the signal which is output from the preamplifier 801. As shown in FIG. 19, the modulation factor is represented by (A−B)/A, where amplitude A is the amplitude from the signal level when no optical beam is emitted by the semiconductor laser of the optical head 702, or the signal level when no influence is exerted by the light reflected by the optical disc 601 even though the optical disc 601 is irradiated with an optical beam having a reproduction power emitted by the semiconductor laser of the optical head 702, to the signal level corresponding to the mark; and amplitude B is the amplitude from the signal level when no optical beam is emitted by the semiconductor laser of the optical head 702 to the signal level corresponding to the space.

Returning to FIG. 17, a conventional recording power determination method will be described.

On the optical disc 601, a constant parameter is recorded to be used for determination of the recording power. The optical head 702 generates a signal 703 indicating the constant parameter (hereinafter, referred to as a "predetermined value") read from the optical disc 601, and outputs the signal 703 to the reproduction section 704. The binary data generation section 805 of the reproduction section 704 generates the binary signal 705 obtained by binarizing the signal 703 indicating the predetermined value, and outputs the signal 705 to the recording power determination section 708.

The recording power setting section 710 sets a test recording power of the optical beam in the laser driving circuit 712. The recording power setting section 710 sets eight different test recording powers A through R. In this example, the test recording power A is the largest power, and the test recording powers become smaller from the test recording power B toward the test recording power H.

The recording data generation section 714 generates test data, and outputs a signal 715 indicating the generated test data to the laser driving circuit 712. The laser driving circuit 712 drives the optical head 702 to record the test data over substantially one circle of the track continuously from a predetermined position in the recording power determination area of the optical disc 601. The recording data generation section 714 generates the test data such that the optical head 702 continuously forms 8T marks and 8T spaces on the optical disc 601. The test data is repeatedly recorded over substantially one circle of the optical disc 601 at the test recording powers A through H. FIG. 20 shows areas of the optical disc 601 corresponding to the test recording powers "A" through H with letters through "H".

When the recording of the test data is finished, the optical head 702 irradiates the optical disc 601 with an optical beam having a reproduction power. By, this, the test data recorded on the track is read, and a signal indicating the test data is generated. The amplitude of the signal generated by the optical head 702 changes in accordance with whether or not the marks are formed on the optical disc 601. The signal 703 generated by the optical head 702 is input to the reproduction section 704.

Returning to FIG. 18, the preamplifier 801 of the reproduction section 704 amplifies the signal 703. The sampling and holding circuit 802 holds the peak value and the bottom value of the signal amplified by the preamplifier 801. The A/D converter 803 digitizes the peak value and the bottom value of the signal held by the sampling and holding circuit 802. The arithmetic operator 804 performs an arithmetic operation on the digitized peak value and bottom value to obtain the modulation factor of the signal. Since the amplitude of the signal 703 is different in accordance with the test recording powers A through H, the modulation factor is also different in accordance with the test recording powers A through H. The arithmetic operator 804 generates a signal 707 indicating the modulation factors of the signal, and outputs the signal 707 to the recording power determination section 708.

The recording power determination section 708 determines the recording power based on the modulator factors corresponding to the test recording powers A through H by one of two conventional recording power determination methods described below.

FIG. 21 shows a view for describing a first conventional recording power determination method, and is a graph illustrating the relationship between the test recording power and the modulation factor. According to the first conventional recording power determination method, the recording power determination section 708 selects a recording power P0 corresponding to a modulation factor MO based on the correlation between the plurality of test recording powers and a plurality of modulation factors corresponding to the plurality of test recording powers. The recording power determination section 708 calculates a product of the recording power P0 and a predetermined value read from the optical disc 601 and thus determines the recording power used for recording data. The recording power determination section 708 outputs a signal 709 indicating the calculated recording power to the recording power setting section 710.

FIG. 22 shows a view for describing a second conventional recording power determination method, and is a graph illustrating the relationship between (i) the test recording power and (ii) the product of the modulation factor and the recording power. According to the second conventional recording power determination method, the recording power determination section 708 calculates a product of each of the plurality of test recording powers and a modulation factor corresponding thereto, and thus creates an approximate line indicating the correlation between (i) the test recording power and (ii) the product of the modulation factor and the test recording power. Then, the recording power determination section 708 obtains a recording power Pthr at which the product is 0 on the approximate line. Next, the recording power determination section 708 calculates a product of the recording power Pthr and a predetermined value read from the optical disc 601, and determines the recording power used for recording data. The recording power determination section 708 outputs a signal 709 indicating the calculated value to the recording power setting section 710.

However, an appropriate recording power cannot be determined either by the first conventional recording power determination method or the second conventional recording power determination method.

In the case that the recording power determination section 708 determines the recording power according to the first conventional recording power determination method, the recording power determination section 708 cannot determine an appropriate recording power when, for example, there is a relative tilt between the optical disc 601 and the optical head 702. Hereinafter, with reference to FIG. 23, the recording power when there is such a tilt will be described.

FIG. 23 is a graph illustrating the relationship between the recording power and the modulation factor. In the graph of FIG. 23, a solid line 1101 represents the result obtained when there is no tilt at the time of data recording or at the time of reading of the recorded data. A solid line 1102 represents the result obtained when there is a tilt at the time of data recording, but there is no tilt at the time of data reading. A solid line 1103 represents the result obtained when there is a tilt both at the time of data recording and at the time of data reading. The modulation factor is smaller when there is a tilt than when there is no tilt. In the case where there is no tilt at the time of data reading but there is a tilt at the time of data recording, the modulation factor corresponding to the recording power H, which is smallest among the eight recording powers, cannot be measured. Similarly, in the case where there is a tilt both at the time of data recording and at the time of data reading, the modulation factor corresponding to the recording power H cannot be measured.

Test data is recorded and read before user data is recorded. The test data is read immediately after being recorded. Accordingly, when the test data is recorded and read while there is a relative tilt, the result represented by the solid, line 1103 in FIG. 23 is obtained. When determining the recording power by the first conventional recording power determination method, the recording power determination section 708 selects a recording power P1103 corresponding to the modulation factor MO. This result is influenced by the tilt at the time of test data recording and also by the tilt when the test data is read (hereinafter, referred to as "at the time of test data reading").

In the case where there is a tilt at the time of test data recording, it is considered that there is a tilt also at the time of user data recording. However, there is not necessarily a tilt at the time of user data reading. It is very rare that the user data is read immediately after being recorded. In many cases, the user data is read by another optical disc apparatus or after the optical disc is re-mounted on the optical disc apparatus. Therefore, there is no tilt at the time of user data reading. Accordingly, for determining the recording power, only the influence of the tilt at the time of test data recording, needs to be considered. It is not necessary to consider the influence of the tilt at the time of test data reading. Therefore, the recording power which should be selected when there is a relative tilt is not the recording power P1103 but is a recording power P1102 in FIG. 23. When determining the recording power by the first conventional recording power determination method, the recording power determination section 708 selects the recording power P1103, which is larger than the recording power P1102. Therefore, the optical head 702 records data with an unnecessarily large power. As a result, by the first conventional recording power determination method, the optical disc 601 is deteriorated unnecessarily quickly by repeated recording.

When using the second conventional recording power determination method for determining the recording power, the following occurs as shown in FIG. 24. When the recording power determination section 708 selects four larger test recording powers among the eight test recording powers and creates an approximate line indicating the correlation between (i) each of these four test recording powers and (ii) the product of the modulation factor and each of these four recording powers, the recording power at which the product is 0 on the approximate line is the recording power Pthr1. By contrast, when the recording power determination section 708 selects four smaller test recording powers among the eight test recording powers and creates an approximate line indicating the correlation between (i) each of these four test recording powers and (ii) the product of the modulation factor and each of these four recording powers, the recording power at which the product is 0 on the approximate line is a recording power Pthr2.

As is clear from FIG. 24, the recording power at which the product is 0 on the approximate line is significantly different in accordance with the test recording power. Namely, when determining the recording power by the second conventional recording power determination method, the recording power to be determined is significantly different depending on the test recording power which is used for recording the test data and depending on the test recording power, the result of which is used for determining the recording power. Accordingly, when using the second conventional recording power recording method, the recording power determination section 708 cannot uniquely determine an appropriate recording power. In addition, when the recording power determination section 708 determines a recording power larger than an appropriate recording power, the optical disc is deteriorated unnecessarily quickly. By contrast, when the recording power determination section 708 determines a recording power smaller than an appropriate recording power, the data cannot be recorded properly on the optical disc.

The present invention, made in light of the above-described problems, has an object of providing a recording power determination method and a recording power determination device for determining an appropriate recording power.

SUMMARY OF THE INVENTION

A recording power determination method according to the present invention, for determining a recording power of an optical beam, for recording data on an information storage medium, comprises a test data recording step of recording test data on the information storage medium at a plurality of test recording powers; a modulation factor measuring step of reading the test data recorded at each of the plurality of test recording powers, generating a signal, and measuring a modulation factor of the signal corresponding to each of the plurality of test recording powers; a product obtaining step of calculating a product of an n'th power of each of the plurality of test recording powers and the modulation factor corresponding thereto, thereby obtaining a plurality of products corresponding to the plurality of test recording powers, where n is a value of exponent and is a real number other than 1; a first recording power calculating step of calculating a first recording power based on the correlation between the plurality of test recording powers and the plurality of products; and a recording power calculating step of calculating the recording power based on the first recording power.

In one embodiment, the first recording power calculating step includes the step of creating an approximate line indicating the correlation between the plurality of test recording powers and the plurality of products, and calculates the first recording power at which the product is 0 on the approximate line.

In one embodiment, in the product obtaining step, the value of exponent n is 2.

In one embodiment, the recording power determination method further comprises a value reading step of reading a value recorded on the information storage medium. The information storage medium has a value of Pind, a value of ρ and a value of κ recorded thereon; the value reading step includes the step of reading the value of Pind, the value of ρ and the value of κ; the test data recording step includes the step of setting a range of the plurality of test recording powers to be a range of 0.9 times to 1.1 times the value of Pind; the first recording power calculating step includes the step of creating an approximate line indicating the correlation between the plurality of test recording powers and the plurality of products, and calculating the first recording power at which the product is 0 on the approximate line; and the recording power calculating step includes the step of calculating a product of the first recording power, (−1/(the value of κ)+2) and the value of ρ.

In one embodiment, the recording power determination method further comprises a value reading step of reading a value recorded on the information storage medium. The information storage medium has the value of exponent n recorded thereon; the value reading step includes the step of reading the value of exponent n; and the product obtaining step includes the step of using the read value of exponent n.

In one embodiment, the test data recording step includes the step of recording the test data such that the signal generated in the modulation factor measuring step includes a plurality of single cycle signals.

In one embodiment, the information storage medium has a plurality of marks and a plurality of spaces formed thereon by the optical beam which has been modulated; and the test data recording, step includes the step of forming the plurality of marks such that an amplitude of the signal generated in the modulation factor measuring step is substantially the same as the amplitude of the longest mark among the plurality of marks formed on the information storage medium.

In one embodiment, the information storage medium has a plurality of tracks concentrically or spirally formed therein.

In one embodiment, the product obtaining step includes the step of obtaining a plurality of products corresponding to the plurality of test recording powers regarding each of a plurality of values provided as the value of exponent n; the recording power determination method further comprises a value determining step of calculating a linearity of the correlation between the plurality of test recording powers and the plurality of products regarding each of the plurality of values, thereby calculating a plurality of linearities corresponding to the plurality of values, and determining one of the plurality of values which corresponds to the highest linearity; and the first recording power calculating step includes the step of calculating the first recording power using the plurality of products corresponding to the plurality of test recording powers regarding the one of the plurality of values which corresponds to the highest linearity.

In one embodiment, the plurality of values include a first value and a second value; and the first value is 2, and the second value is 3.

In one embodiment, the recording power determination method further comprises a value reading step of reading a value recorded on the information storage medium. The information storage medium has a value of Pind, a value of $\rho$ and a value of $\kappa$ recorded thereon; the value reading step includes the step of reading the value of Pind, the value of $\rho$ and the value of $\kappa$; the test data recording step includes the step of setting a range of the plurality of test recording powers to be a range of 0.9 times to 1.1 times the value of Pind; and the first recording power calculating step includes the step of creating an approximate line indicating, the correlation between the plurality of test recording powers and the plurality of products, and calculating the first recording power at which the product is 0 on the approximate line.

In one embodiment, the recording power calculating step includes the steps of, in the case where the linearity when the value of exponent n is 2 is higher than the linearity when the value of exponent n is 3, calculating a product of the first recording power, $(-1/(\text{the value of } \kappa)+2)$ and the value of $\rho$; and in the case where the linearity when the value of exponent n is 3 is higher than the linearity when the value of exponent n is 2, calculating a product of the first recording power, $(3\times(\text{the value of } \kappa)-2)/(2\times(\text{the value of } \kappa)-1)$ and the value of $\rho$.

In one embodiment, the plurality of values include a first value and a second value; and the value determining step includes a first test recording power group setting step of, regarding the first value, selecting at least two test recording powers from the plurality of test recording powers, and setting a first test recording power group including the selected at least two test recording powers; a first gradient calculating step of creating a first straight line based on all the test recording powers included in the first test recording power group and the products corresponding to all the test recording powers included in the first test recording power group, and calculating a first gradient the first straight line; a second test recording power setting step of, regarding the first value, selecting at least two test recording powers which are not completely the same as the at least two test recording powers included in the first test recording power group, from the plurality of test recording powers, and setting a second test recording power group including the selected at least two test recording powers; a second gradient calculating step of creating a second straight line based on all the test recording powers included in the second test recording power group and the products corresponding to all the test recording powers included in the second test recording power group, and calculating a second gradient of the second straight line; a first ratio obtaining step of obtaining a first ratio corresponding to the first value based on the first gradient and the second gradient; a third test recording power group setting step of, regarding the second value, selecting at least two test recording powers from the plurality of test recording powers, and setting a third test recording power group including the selected at least two test recording powers; a third gradient calculating step of creating a third straight line based on all the test recording powers included in the third test recording power group and the products corresponding to all the test recording powers included in the third test recording power group, and calculating a third gradient of the third straight line; a fourth test recording power group setting step of, regarding the second value, selecting at least two test recording powers which are not completely the same as the at least two test recording powers included in the third test recording power group, from the plurality of test recording powers, and setting a fourth test recording power group including the selected at least two test recording powers; a fourth gradient calculating step of creating a fourth straight line based on all the test recording powers included in the fourth test recording power group and the products corresponding to all the test recording powers included in the fourth test recording power group, and calculating a fourth gradient of the fourth straight line; a second ratio obtaining step of obtaining a second ratio corresponding to the second value based on the third gradient and the fourth gradient; and a comparing step of comparing the first ratio and the second ratio.

In one embodiment, the first test recording power group setting step includes the step of selecting two largest test recording powers among the plurality of test recording powers; the second test recording power group setting step includes the step of selecting two smallest test recording powers among the plurality of test recording powers; the third test recording power group setting step includes the step of selecting two largest test recording powers among the plurality of test recording powers; and the fourth test recording power group setting step includes the step of selecting two smallest test recording powers among the plurality of test recording powers.

In one embodiment, the recording power determination method further comprises the steps of calculating a first average power indicating an average of all the plurality of test recording powers regarding the first value; and calculating a second average power indicating an average of all the plurality of test recording powers regarding the second value. The first test recording power group setting step includes the step of selecting the test recording powers to be included in the first test recording power group from the plurality of test recording powers, such that an average of the test recording powers included in the first test recording power group is larger than the first average power; the second test recording power group setting step includes the step of selecting the test recording powers to be included in the second test recording power group from the plurality of test recording powers, such that an average of the test recording powers included in the second: test recording power group is smaller than the first average power; the third test recording power group setting step includes the step of selecting the test recording powers to be included in the third test recording power group from the plurality of test recording powers, such that an average of the test recording powers included in the third test recording power group is larger than the second average power; and the fourth test recording power group setting step includes the step of selecting the test recording powers to be included in the fourth test recording power group from the plurality of test recording powers, such that an average of the test recording powers included in the fourth test recording power group is smaller than the second average power.

In one embodiment, the recording power determination method further comprises the step of recording the one of the plurality of values which corresponds to the highest linearity on the information storage medium.

In one embodiment, the information storage medium has identification information recorded thereon for identifying the information storage medium; and the recording power determination method further comprises the step of storing the identification information, and the one of the plurality of values which corresponds to the highest linearity and corresponds to the identification information, in an identification information storage section.

In one embodiment, the recording power determination method further comprises the step of reading the identification information recorded on the information storage medium. The product obtaining step includes the step of determining whether or not the read identification information is the same as the identification information stored in the identification information storage section, and when the read identification information is determined to be the same as the identification information stored in the identification information storage section, using the value corresponding to the identification information stored in the identification information storage section.

In one embodiment, the identification information includes data indicating a manufacturer or a lot of the information storage medium.

A program according to the present invention causes an information recording apparatus to perform the steps of the above-described recording power determination method.

A recording power determination, device according to the present invention, for determining a recording power of an optical beam used when a recording section records data on an information storage medium, the device, comprises an input section for receiving a signal indicating a plurality of modulation factors corresponding to a plurality of test recording powers; a calculation section for calculating a product of an n'th power of each of the plurality of test recording powers and the modulation factor corresponding thereto, so as to obtain a plurality of products corresponding to the plurality of test recording powers, calculating a first recording power based on the correlation between the plurality of test recording powers and the plurality of products, and calculating the recording power based on the first recording power, where n is a value of exponent and is a real number other than 1; and an output section for outputting, a signal indicating the recording power calculated by the calculation section to the recording section.

In one embodiment, the calculation section creates an approximate line indicating the correlation between the plurality of test recording powers and the plurality of products, and calculates the first recording power at which the product is 0 on the approximate line.

In one embodiment, the value of exponent n is 2.

In one embodiment, the input section receives a signal indicating a value of Pind, a value of $\rho$, and a value of $\kappa$; the output section outputs a signal indicating the test recording powers in a range of 0.9 times to 1.1 times the value of Pind to the recording section; and the calculation section creates an approximate line indicating the correlation between the plurality of test recording powers and the plurality of products, calculates the first recording power at which the product is 0 on the approximate line, and calculates a product of the first recording power, $(-1/(\text{the value of }\kappa)+2)$ and the value of $\rho$, so as to calculate the recording power.

In one embodiment, the input section receives a signal indicating the value of exponent n; and the calculation section uses a value of exponent n.

In one embodiment, the calculation section obtains a plurality of products corresponding to the plurality of test recording powers regarding each of a plurality of values provided as the value of exponent n, calculates a linearity of the correlation between the plurality of test recording powers and the plurality of products regarding each of the plurality of values, so as to calculate a plurality of linearities corresponding to the plurality of values, determines one of the plurality of values which corresponds to the highest linearity, and calculates the first recording power using the plurality of products corresponding to the plurality of test recording powers regarding the one of the plurality of values which corresponds to the highest linearity.

In one embodiment, the plurality of values include a first value and a second value; and the first value is 2, and the second value is 3.

In one embodiment, the input section receives a signal indicating a value of Pind, a value of $\rho$, and a value of $\kappa$; the output section outputs a signal indicating the test recording powers in a range of 0.9 times to 1.1 times the value of Pind to the recording section; and the calculation section creates an approximate line based on the correlation between the plurality of test recording powers and the plurality of products, and calculates the first recording power at which the product is 0 on the approximate line.

In one embodiment, in the case where the linearity when the value of exponent n is 2 is higher than the linearity when the value of exponent n is 3, the calculation section calculates a product of the first recording power, $(-1/(\text{the value of }\kappa)+2)$ and the value of $\rho$; and in the case where the linearity when the value of exponent n is 3 is higher than the linearity when the value of exponent n is 2, the calculation section calculates a product of the first recording power, $(3\times(\text{the value of }\kappa)-2)/(2\times(\text{the value of }\kappa)-1)$ and the value of $\rho$.

In one embodiment, the plurality of values include a first value and a second value; and the calculation section, regarding the first value, selects at least two test recording powers from the plurality of test recording powers, and sets a first test recording power group including the selected at least two test recording powers; creates a first straight line based on all the test recording powers included in the first test recording power group and the products corresponding to all the test recording powers included in the first test recording power group, and calculates a first gradient of the first straight line; regarding the first value, selects at least two test recording powers which are not completely the same as the at least two test recording powers included in the first test recording power group, from the plurality of test recording powers, and sets a second test recording power group including the selected at least two test recording powers; creates a second straight line based on all the test recording powers included in the second test recording power group and the products corresponding to all the test recording powers included in the second test recording power group, and calculates a second gradient of the second straight line; obtains a first ratio corresponding to the first value based on the first gradient and the second gradient; regarding the second value, selects at least two test recording, powers from the plurality of test recording powers, and sets a third test recording power group including the selected at least two test recording powers; creates a third straight line based on all the test recording powers included in the third test recording power group and the products corresponding to all the test recording powers included in the third test recording power group, and calculates a third gradient of the third straight line; regarding the second value, selects at least two test recording powers which are not completely the same as the at least two test recording powers included in the third test recording power group, from the plurality of test recording powers, and sets a fourth test recording power group including the selected at least two test recording powers; creates a fourth straight line based on all the test recording powers included in the fourth test recording power group and the products corresponding to all the test recording, powers included in the fourth test recording power group, and calculates a fourth gradient of the fourth straight line; obtains a second ratio corresponding to the second value based on the third gradient and the fourth gradient; and compares the first ratio and the second ratio, so as to determine one of the first value and the second value which corresponds to the higher linearity.

In one embodiment, the calculation section, when setting the first test recording power group, selects two largest test recording powers among the plurality of test recording powers; when setting the second test recording power group, selects two smallest test recording powers among the plurality of test recording powers; when setting the third test recording power group, selects two largest test recording powers among the plurality of test recording powers; and when setting the fourth test recording power group, selects two smallest test recording powers among the plurality of test recording powers.

In one embodiment, the calculation section calculates a first average power indicating an average of all the plurality of test recording powers regarding the first value; calculates a second average power indicating an average of all the plurality of test recording powers regarding the second value; when setting the first test recording power group, selects the test recording powers to be included in the first test recording power group from the plurality of test recording powers, such that an average of the test recording powers included in the first test recording power group is larger than the first average power; when setting the second test recording power group, selects the test recording powers to be included in the second test recording power group from the plurality of test recording powers, such that an average of the test recording powers included in the second test recording power group is smaller than the first average power; when setting the third test recording power group, selects the test recording powers to be included in the third test recording power group from the plurality of test recording powers, such that an average of the test recording powers included in the third test recording power group is larger than the second average power; and when setting the fourth test recording power group, selects the test recording powers to be included in the fourth test recording power group from the plurality of test recording powers, such that an average of the test recording powers included in the fourth test recording power group is smaller than the second average power.

In one embodiment, the output section outputs a signal to the recording section such that the recording section records the one of the plurality of values which corresponds to the highest linearity on the information storage medium.

An information recording apparatus according to the present invention comprises a recording section for recording data on an information storage medium using an optical beam; a reading section for reading the data recorded on the information storage medium; and a recording power determination device for determining a recording power of the optical beam used when the recording section records the data on the information storage medium. The recording section records test data on the information storage medium at a plurality of test recording powers; the reading section reads the test data recorded on the information storage medium at each of the plurality of test recording powers, generates a signal, and measures a modulation factor of the signal corresponding to each of the plurality of test recording powers; and the recording power determination device calculates a product of an n'th power of each of the plurality of test recording powers and the modulation factor corresponding thereto, so as to obtain a plurality of products corresponding to the plurality of test recording powers, calculates a first recording power based on the correlation between the plurality of test recording powers and the plurality of products, and calculates the recording power based on the first recording power, where n is a value of exponent and is a real number other than 1.

In one embodiment, the value of exponent n is 2; the information storage medium has a value of Pind, a value of $\rho$, and a value of $\kappa$ recorded thereon; the reading section reads the value of Find, the value of $\rho$, and the value of $\kappa$; the recording power determination device determines a range of the plurality of test recording powers to be a range of 0.9 times to 1.1 times the value of Find; and the recording power determination device creates an approximate line indicating the correlation between the plurality of test recording powers and the plurality of products, calculates the first recording power at which the product is 0 on the approximate line, and calculates a product of the first recording power, $(-1/(\text{the value of } \kappa)+2)$ and the value of $\rho$.

In one embodiment, the recording section records the test data such that the signal generated by the reading section includes a plurality of single cycle signals.

In one embodiment, the recording section forms a plurality of marks and a plurality of spaces on the information storage medium by the optical beam which has been modulated; and the recording section forms the plurality of marks such that an amplitude of the signal generated by the reading section is substantially the same as the amplitude of the longest mark among the plurality of marks formed on the information storage medium.

In one embodiment, the recording power determination device obtains a plurality of products corresponding to the plurality of test recording powers regarding each of a plurality of values provided as the value of exponent n, calculates a linearity of the correlation between the plurality of test recording power and the plurality of products regarding each of the plurality of values, so as to calculate a plurality of linearities corresponding to the plurality of values, and determines one of the plurality of values which corresponds to the highest linearity; and the recording section records one of the plurality of values which corresponds to the highest linearity on the recording information medium.

In one embodiment, the recording power determination device includes a memory for storing the one of a plurality of values which corresponds to the highest linearity.

In one embodiment, the information storage medium has identification information recorded thereon for identifying the information storage medium; the reading section reads the identification information; the memory includes an identification information storage section for storing the identification information and the one of the plurality of values which corresponds to the highest linearity and corresponds to the identification information; the identification information, and the one of the plurality of values which corresponds to the highest linearity and corresponds to the identification information, are stored in the identification information storage section; and the recording power determination device reads the identification information recorded on the information storage medium, determines whether or not the read identification information is the same as the identification information stored in the identification information storage section, and when the read identification information is determined to be the same as the identification information stored in the identification information storage section, uses the value corresponding to the identification information stored in the identification information storage section.

In one embodiment, the identification information includes data indicating a manufacturer or a lot of the information storage medium.

An information storage medium according to the present invention includes an area for storing a value of exponent n corresponding to a linearity which is highest among a plurality of linearities, wherein the highest linearity is obtained by: calculating a product of an n'th power of each of a plurality of test recording powers and a modulation factor corresponding thereto, thereby obtaining a plurality of products corresponding to the plurality of test recording powers, and obtaining a linearity of the correlation between the plurality of test recording powers and the plurality of the products regarding each of a plurality of values of exponent n, based on the plurality of test recording powers and the plurality of products corresponding to the plurality of test recording powers.

A recording power determination method according to the present invention, for determining a recording power of an optical beam for recording data on an information storage medium, wherein the information storage medium has a value of Mind and a value of $\rho$ recorded thereon, comprises a value reading step of reading a value recorded on the information storage medium, including the step of reading the value of Mind and the value of $\rho$; a confirming step of recording test data on the information storage medium at a plurality of test recording powers, reading the test data recorded at each of the plurality of test recording powers, generating a signal, measuring a plurality of modulation factors of the signal corresponding to the plurality of test recording powers, and confirming that largest modulation factor among the plurality of modulation factors is larger than the value of Mind and that the smallest modulation factor among the plurality of modulation factors is smaller than the value of Mind; a first recording power calculating step of calculating a first recording power based on the plurality of test recording powers and the plurality of modulation factors; and a recording power calculating step of calculating the recording power based on the first recording power and the value of $\rho$.

In one embodiment, the confirming step includes the steps of determining whether or not the largest modulation factor among the plurality of modulation factors is smaller than the value of Mind, and when the largest modulation factor among the plurality of modulation factors is determined to be smaller than the value of Mind, repetitively recording the test data at a plurality of larger test recording powers until a modulation factor which is larger than the value of Mind is measured; and determining whether or not the smallest modulation factor among the plurality of modulation factors is larger than the value of Mind, and when the smallest modulation factor among the plurality of modulation factors is determined to be larger than the value of Mind, repetitively recording the test data at a plurality of smaller test recording powers until a modulation factor which is smaller than the value of Mind is measured.

In one embodiment, the first recording power calculating step includes the steps of calculating a product of an n'th power of each of the plurality of test recording powers and a modulation factor corresponding thereto, thereby obtaining a plurality of products corresponding, to the plurality of test recording powers, where n is a value of exponent and is a real number; and calculating the first recording power based on the correlation between the plurality of test recording powers and the plurality of products.

In one embodiment, the first recording power calculating step includes the step of creating an approximate line indicating, the correlation between the plurality of test recording powers and the plurality of products, and calculating the first recording power at which the product is 0 on the approximate line.

In one embodiment, the value of exponent n is 1.

In one embodiment, the information storage medium has a value of Pind and a value of $\kappa$ recorded thereon; the value reading step includes the step of reading the value of Pind and the value of $\kappa$; the confirming step includes the step of setting a range of the plurality of test recording powers to be a range of 0.9 times to 1.1 times the value of Pind; the first recording power calculating step includes the step of creating an approximate line indicating the correlation between the plurality of test recording powers and the plurality of products, and calculating the first recording power at which the product is 0 on the approximate line; and the recording power calculating step includes the step of calculating a product of the first recording power, the value of $\kappa$ and the value of $\rho$.

In one embodiment, the value of exponent n is 2.

In one embodiment, the information storage medium has a value of Find and a value of $\kappa$ recorded thereon; the value reading step includes the step of reading the value of Pind and the value of $\kappa$; the confirming step includes the step of setting a range of the plurality of test recording powers to be a range of 0.9 times to 1.1 times the value of Pind; the first recording power calculating step includes the step of creating an approximate line indicating the correlation between the plurality of test recording powers and the plurality of products, and calculating the first recording power at which the product is 0 on the approximate line; and the recording power calculating step includes the step of calculating a product of the first recording power, $(-1/(\text{the value of }\kappa)+2)$ and the value of $\rho$.

In one embodiment, the confirming step includes the steps of calculating a predetermined recording power at which the modulation factor is the value of Mind; and setting a range of the plurality of test recording powers such that the smallest test recording power among the plurality of test recording powers is larger than 0.9 times the predetermined recording power.

In one embodiment, the confirming step includes the steps of calculating a predetermined recording power at which the modulation factor is the value of Mind; and setting a range of the plurality of test recording powers such that the largest test recording power among the plurality of test recording powers is smaller than 1.1 times the predetermined recording power.

In one embodiment, the confirming step includes the step of recording the test data such that the generated signal includes a plurality of single cycle signals.

In one embodiment, the information storage medium has a plurality of marks and a plurality of spaces formed by the optical beam which has been modulated; and the confirming: step includes the step of forming the plurality of marks such that an amplitude of the generated signal is substantially, the same, as the amplitude of the longest mark among the plurality of marks formed on the information storage medium.

In one embodiment, the information storage medium has a plurality of tracks concentrically or spirally formed therein.

A program according to the present invention causes an information recording apparatus to perform the steps of the above-described recording power determination method.

A recording power determination device according to the present invention, for determining a recording power of an optical beam used when a recording section records data on an information storage medium, comprises an input section for receiving a signal indicating a plurality of modulation factors corresponding to a plurality of test recording powers, a value of Mind, and a value of $\rho$; a calculation section for confirming that the largest modulation factor among the plurality of modulation factors is larger than the value of Mind and that the smallest modulation factor among the plurality of modulation factors is smaller than the value of Mind, calculating a first recording power based on the plurality of test recording powers and the plurality of modulation factors, and calculating the recording power based on the first recording power and the value of $\rho$; and an output section for outputting a signal indicating the recording power calculated by the calculation section to the recording section.

In one embodiment, the calculation section calculates a product of an n'th power of each of the plurality of test recording powers and a modulation factor corresponding thereto, so as to obtain a plurality of products corresponding to the plurality of test recording powers, where n is a value of exponent and is a real number; calculates the first recording power based on the correlation between the plurality of test recording powers and the plurality of products; and calculates a product of the first recording power and the value of $\rho$.

In one embodiment, the calculation section creates an approximate line indicating the correlation between the plurality of test recording powers and the plurality of products, and calculates the first recording: power at which the product is 0 on the approximate line.

In one embodiment, the value of exponent n is 1; the input section receives a value of Pind and a value of $\kappa$; the output section outputs a signal indicating the test recording powers in a range of 0.9 times to 1.1 times the value of Pind to the recording section; and the calculation section creates an approximate line indicating the correlation between the plurality of test recording powers and the plurality of products, calculates the first recording power at which the product is 0 on the approximate line, and calculates a product of the first recording power, the value of $\kappa$ and the value of $\rho$.

In one embodiment, the value of exponent n is 2; the input section receives a value of Pind and a value of $\kappa$; the output section outputs a signal indicating the test recording powers in a range of 0.9 times to 1.1 times the value of Pind to the recording section; and the calculation section creates an approximate line indicating the correlation between the plurality of test recording powers and the plurality of products, calculates the first recording power at which the product is 0 on the approximate line, and calculates a product of the first recording power, $(-1/(\text{the value of }\kappa)+2)$ and the value of $\rho$.

In one embodiment, the calculation section calculates a predetermined recording power at which the modulation factor is the value of Mind, and sets the plurality of test recording powers such that the smallest test recording power among the plurality of test recording powers is larger than 0.9 times the predetermined recording power; and the output section outputs a signal indicating the set plurality of test recording powers to the recording section.

In one embodiment, the calculation section calculates a predetermined recording power at which the modulation factor is the value of Mind, and sets the plurality of test recording powers such that the largest test recording power among the plurality of test recording powers is smaller than 1.1 times the predetermined recording power; and the output section outputs a signal indicating the set plurality, of test recording powers to the recording section.

An information recording apparatus according to the present invention comprises a recording section for recording data on an information storage medium using an optical beam; a reading section for reading the data recorded on the information storage medium; and a recording power determination device for determining a recording power of the optical beam used when the recording section records the data on the information storage medium. The information storage medium has a value of Mind and a value of $\rho$ recorded thereon; the reading section reads the value of Mind and the value of $\rho$; the recording section records test data on the information storage medium at a plurality of test recording powers; the reading section reads the test data recorded on the information storage medium at each of the plurality of test recording powers, generates a signal, and measures a plurality of modulation factors of the signal corresponding to the plurality of test recording powers; and the recording power determination device confirms that largest modulation factor among the plurality of modulation factors is larger than the value of Mind and that the smallest modulation factor among the plurality of modulation factors is smaller than the value of Mind, calculates a first recording power based on the plurality of test recording powers and the plurality of modulation factors, and calculates the recording power based on the first recording power and the value of $\rho$.

In one embodiment, the recording power determination device determines whether or not the largest modulation factor among the plurality of modulation factors is smaller than the value of Mind, and when the largest modulation factor among the plurality of modulation factors is determined to be smaller than the value of Mind, determines a plurality of larger test recording powers until the reading section measures a modulation factor which is larger than the value of Mind; and the recording power determination device determines whether or not the smallest modulation factor among the plurality of modulation factors is larger than the value of Mind, and when the smallest modulation factor among the plurality of modulation factors is determined to be larger than the value of Mind, determines a plurality of smaller test recording powers until the reading section measures a modulation factor which is smaller than the value of Mind.

In one embodiment, the recording power determination device calculates a product of an n'th power of each of the plurality of test recording powers and a modulation factor corresponding thereto, so as to obtain a plurality of products corresponding to the plurality of test recording powers, where n is a value of exponent and is a real number; calculates the first recording power based on the correlation between the plurality of test recording powers and the plurality of products; and calculates a product of the first recording power and the value of $\rho$.

In one embodiment, the value of exponent n is 1; the information storage medium has a value of Pind and a value of $\kappa$ recorded thereon; the reading section reads the value of Pind and the value of $\kappa$; and the recording power determination device determines a range of the plurality of test recording powers to be a range of 0.9 times to 1.1 times the value of Pind, creates an approximate line indicating the correlation between the plurality of test recording powers and the plurality of products, calculates the first recording power at which the product is 0 on the approximate line, and calculates a product of the first recording power, the value of $\kappa$ and the value of $\rho$.

In one embodiment, the value of exponent n is 2; the information storage medium has a value of Pind and a value of $\kappa$ recorded thereon; the reading section reads the value of Pind and the value of $\kappa$; the recording power determination device determines a range of the plurality of test recording powers to be a range of 0.9 times to 1.1 times the value of Pind, creates an approximate line indicating the correlation between the plurality of test recording powers and the plurality of products, calculates the first recording power at which the product is 0 on the approximate line, and calculates a product of the first recording power, (−1/(the value of κ)+2) and the value of ρ.

In one embodiment, the recording power determination device calculates a predetermined recording power at which the modulation factor is the value of Mind, and determines a range of the plurality of test recording powers such that the smallest test recording power among the plurality of test recording powers is larger than 0.9 times the predetermined recording power.

In one embodiment, the recording power determination device calculates a predetermined recording power at which the modulation factor is the value of Mind, and determines a range of the plurality of test recording powers such that the largest test recording power among the plurality of test recording powers is smaller than 1.1 times the predetermined recording power.

In one embodiment, the recording section records the test data such that the signal generated by the reading section includes a plurality of single cycle signals.

In one embodiment, the recording section forms a plurality of marks and a plurality of spaces on the information storage medium by the optical beam which has been modulated; and the recording section forms the plurality of marks such that an amplitude of the signal generated by the reading section is substantially the same as the amplitude of the longest mark among the plurality of marks formed on the information storage medium.

According to a recording power determination method and a recording power determination device of the present invention, an appropriate recording power can be determined, and thus data can be properly recorded. In addition, an information storage medium can be prevented from being deteriorated unnecessarily quickly.

According to a program of the present invention, an appropriate recording power can be determined, and thus data can be properly recorded. In addition, an information storage medium can be prevented from being deteriorated unnecessarily quickly.

According to an information recording apparatus of the present invention, an appropriate recording power can be determined, and thus data can be properly recorded. In addition, an information storage medium can be prevented from being deteriorated unnecessarily quickly.

According to an information recording apparatus of the present invention, a value corresponding to the highest linearity among a plurality of values each recorded on an information storage medium as the value of exponent is read. Using the value, an appropriate recording power can be determined quickly with no need of comparison on linearity.

BRIEF DESCRIPTION OF THE DRAWINGS

FIG. 8 shows a view for describing the first embodiment of the recording power determination method according to the present invention, in which

FIG. 9 shows a view for describing an influence of a tilt in the first embodiment of the recording power determination method according to the present invention, in which

FIG. 12 shows a view for describing an influence of a tilt in a second embodiment of a recording power determination method according to the present invention, in which

FIG. 14 shows a view for describing the third embodiment of the recording power determination method according to the present invention, in which

FIG. 15 shows a view for describing a fourth embodiment of a recording power determination method, according to the present invention, in which

FIG. 21 shows a view for describing a first conventional recording power determination method and is a graph illustrating the relationship between the test recording power and the modulation factor.

DETAILED DESCRIPTION OF PREFERRED EMBODIMENTS

Embodiment 1

Hereinafter, Embodiment 1 of a recording power determination method and a recording power determination device according to the present invention will be described with reference to FIGS. 1 through 11.

Figure 1:
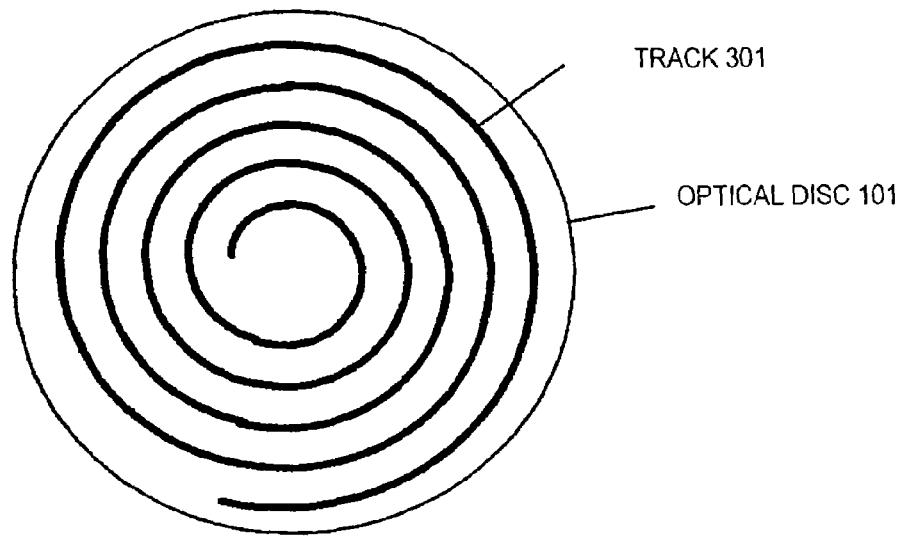
FIG. 1 is a schematic view showing an optical disc in the present invention.

FIG. 1 is a schematic view showing an optical disc 101 in this embodiment. The optical disc 101 has a track 301 formed therein spirally. By irradiating the track 301 with an optical beam having a modified recording power, a plurality of marks and a plurality of spaces are formed on the track 301. Thus, data is recorded. The optical disc 101 includes a user data area used for data recording by the user and a recording power determination area used for determining a recording power of the optical beam. The recording power determination area is provided in an area other than the user data area (specifically, an innermost area or an outermost area of the optical disc 101).

Figure 2:
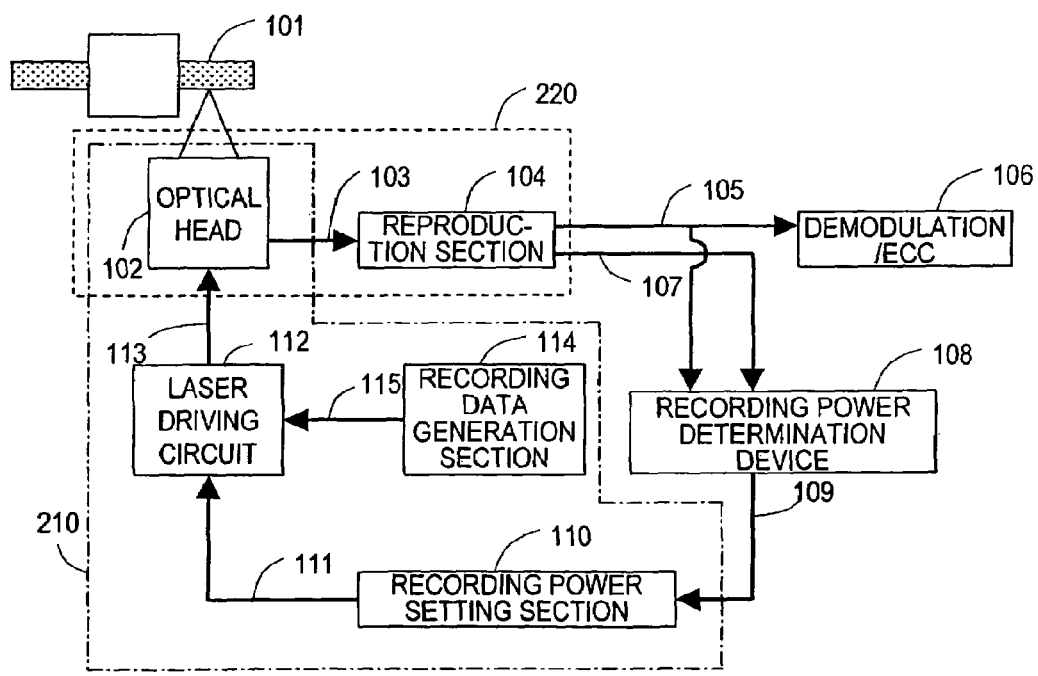
FIG. 2 is a schematic view showing an embodiment of an optical disc apparatus according to the present invention.

FIG. 2 is a schematic view showing an optical disc apparatus 100 including a recording power determination device 108 of this embodiment. The optical disc apparatus 100 includes a recording section 210 for recording data on the optical disc 101 using an optical beam, a reading section 220 for reading data recorded on the optical disc 101, a recording power determination device 108 for determining a recording power of the optical beam used when the recording section 210 records data on the optical disc 101, and a demodulation/ECC (Error Correcting Code) circuit 106. The recording section 210 includes an optical head 102, a recording power setting section 110, a laser driving circuit 112, and a recording data generation section 114. The reading section 220 includes the optical head 102 and a reproduction section 104.

When the optical disc 101 is mounted on the optical disc apparatus 100, the type of the optical disc 101 is identified, and the optical disc 101 is rotated. The optical head 102 has a semiconductor laser (not shown). While being rotated, the optical disc 101 is irradiated with an optical beam emitted from the semiconductor laser of the optical head 102.

For recording data on the optical disc 101, the optical head 102 irradiates the optical disc 101 with an optical beam having a predetermined recording power to form marks on the optical disc 101. In this example, data of the Run Length Limited (1,7) modulation system is recorded by a mark edge recording method. In this case, seven types of marks and spaces are formed on the optical disc 101 on the basis of reference cycle T, which is 2T at the shortest and 8T at the longest.

For reading data from the optical disc 101, the optical head 102 irradiates the optical disc 101 with an optical beam having a reproduction power which is smaller than the recording power and receives light reflected by the optical disc 101. The optical head 102 performs optical/electric conversion on the received light to generate a signal indicating the data recorded on the optical disc 101.

Figure 3:
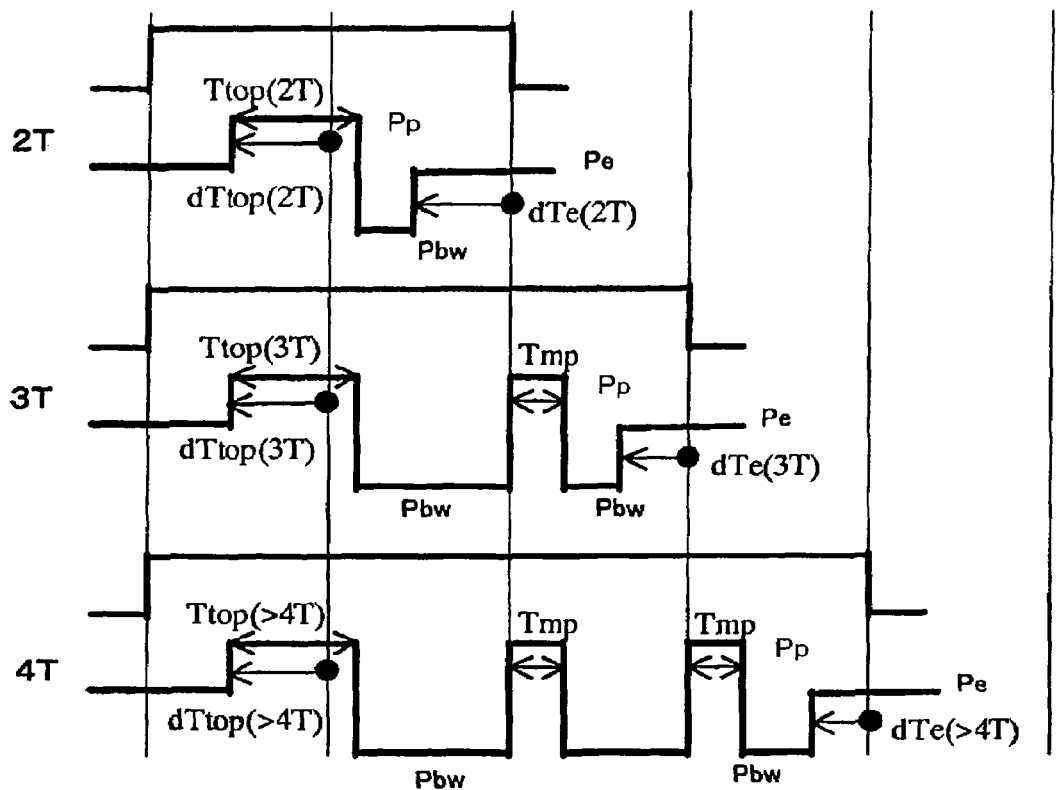
FIG. 3 is a schematic view for describing the relationship between a binary signal waveform and a pulse waveform for forming marks in the present invention.

FIG. 3 shows a schematic view for describing the relationship between a binary signal waveform and a pulse waveform for forming marks. FIG. 3 shows a binary signal waveform corresponding to a 2T mark and a pulse waveform for forming the 2T mark, a binary signal waveform corresponding to a 3T mark and a pulse waveform for forming the 3T mark, and a binary signal waveform corresponding to a 4T mark and a pulse waveform for forming the 4T mark.

The parameters of the recording power are peak power (Pp), bias power (Pe), and bottom power (Pbw). In this embodiment, the ratio among the peak power, the bias power, and the bottom power is constant. As shown in FIG. 3, the number of pulses indicating Pp is one for a 2T mark and two for a 3T mark, and increases one by one as the mark length is increased one T by one T.

The time-related parameters of the pulse waveform are Ttop, dTtop, Tmp and dTe. In FIG. 3, Ttop represents the time length in which the first pulse indicates Pp, and dTop represents the time length between time 1T after the rise of the binary signal waveform and the time of rise of the first pulse. Tmp represents the time length in which the pulses other than the first pulse indicates Pp, and dTe represents the time length between the time of fall of the binary signal waveform and the time at which the last pulse rises from Pbw to Pe.

In this embodiment, the peak power (Pp), the bias power (Pe), the bottom power (Pbw) are common among all the marks (2T through 8T). Tmp is also common among all the marks. Ttop, dTtop and dTe are set as being classified into three classes of 2T, 3T, and 4T or greater.

Returning to FIG. 2, the reproduction section 104 of the optical disc apparatus 100 measures the modulation factor of the signal generated by the optical head 102 and digitizes the signal generated by the optical head 102. The demodulation/ECC circuit 106 demodulates the signal digitized by the reproduction section 104 and corrects errors. The recording power determination device 108 determines the recording power for recording data based on the modulation factor measured by the reproduction section 104. The recording power setting section 110 sets the recording power determined by the recording power determination device 108 in the laser driving circuit 112. The recording data generation section 114 generates data to be recorded on the optical disc 101. The laser driving circuit 112 drives the optical head 102 to record the data generated by the recording data generation section 114 on the optical disc 101 at the recording power set by the recording power setting section 110.

Figure 4:
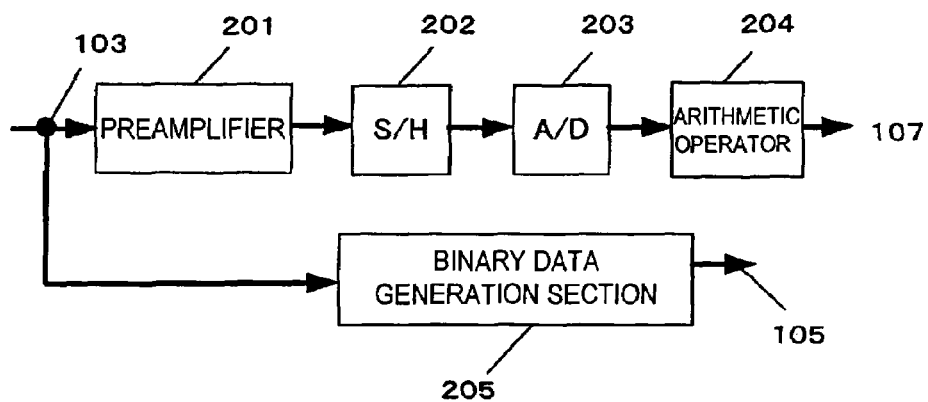
FIG. 4 is a schematic view showing an embodiment of a reproduction section of an optical disc apparatus according to the present invention.

FIG. 4 is a schematic view showing the reproduction section 104 in the optical disc apparatus 100 of this embodiment. As shown in FIG. 4, the reproduction section 104 includes a preamplifier 201, a sampling and holding circuit 202, an A/D converter 203, an arithmetic operator 204, and a binary data generation section 205.

The binary data generation section 205 digitizes the signal generated by the optical head 102 to generate digitized data (binary data), and outputs a signal 105 indicating the binary data to the demodulation/ECC circuit 106 and the recording power determination device 108.

The preamplifier 201 amplifiers the signal generated by the optical head 102. The sampling and holding circuit 202 samples the signal amplified by the preamplifier 201 and holds the peak value and the bottom value of the the bottom value held by the sampling and holding circuit signal. The A/D converter 203 digitizes the peak value and 202. The arithmetic operator 204 performs an arithmetic operation on the digitized peak value and bottom value to obtain a modulation factor, and outputs a signal 107 indicating the modulation factor to the recording power determination device 108.

Figure 5:
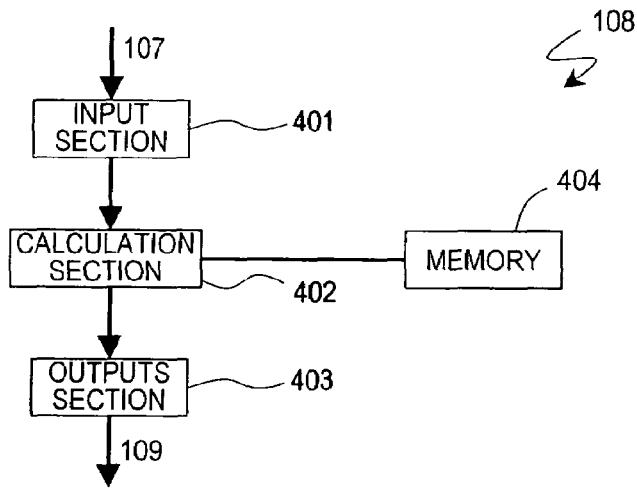
FIG. 5 is a schematic view showing an embodiment of a recording power determination device of an optical disc apparatus according to the present invention.

FIG. 5 is a schematic view showing the recording power determination device 108 of this embodiment. As shown in FIG. 5, the recording power determination device 108 includes an input section 401 for receiving the signal 107 indicating the modulation factor, a calculation section 402 for calculating the recording power of the optical beam used when the recording section 210 records data on the optical disc 101, an output section 403 for outputting the calculated recording power to the recording power setting section 110 of the recording section 210, and a memory 404.

Hereinafter, a recording power determination method of this embodiment will be described with reference to FIG. 6.

On the optical disc 101, a constant parameter is recorded to be used for determination of the recording power. As shown, in S12 of FIG. 6, the optical head 102 generates a signal 103 indicating the constant parameter (hereinafter, referred to as a "predetermined value") read from the optical disc 101, and outputs the signal 103 to the reproduction section 104. The binary data generation section 205 of the reproduction section 104 generates the binary signal 105 obtained by binarizing the signal 103 indicating the predetermined value, and outputs the signal 105 to the recording power determination device 108.

Figure 6:
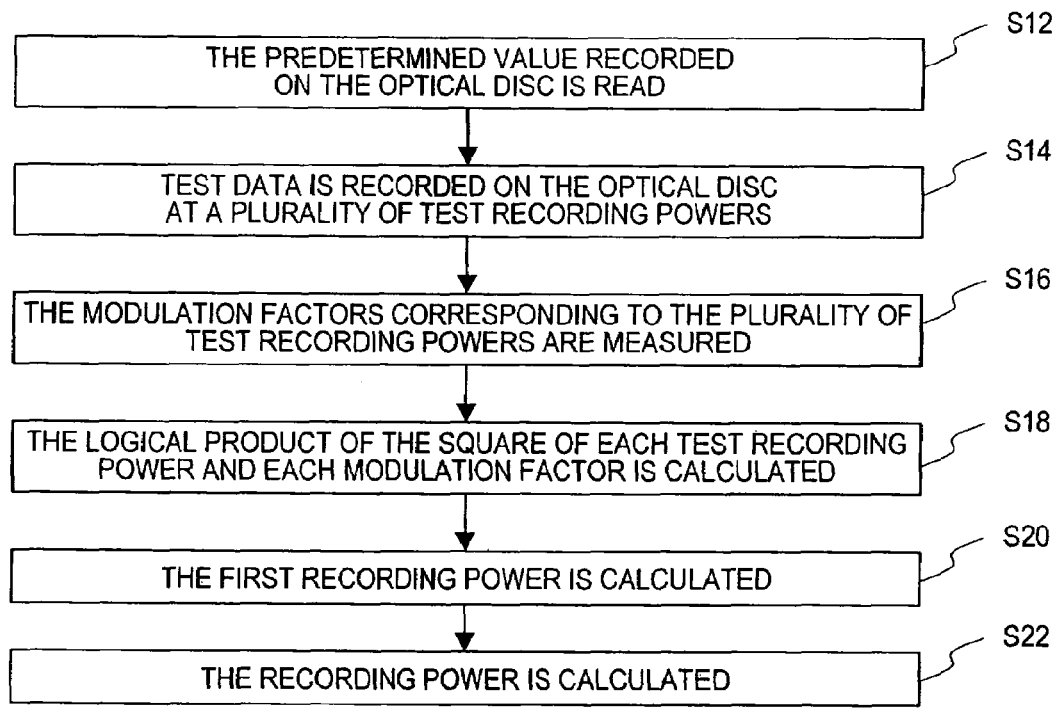
FIG. 6 is a flowchart for describing a first embodiment of a recording power determination method according to the present invention.

As shown in S14 of FIG. 6, test data is recorded on the optical disc 101 at a plurality of test recording powers. For recording the test data, the recording power determination device 108 outputs a signal 109 indicating predetermined eight different test recording powers A through H to the recording power setting section 110. The recording power setting section 110 sets the test recording powers A through H in the laser driving circuit 112. In this example, the test recording power A is the largest power, and the test recording powers become smaller from the test recording power B toward the test recording power H.

Figure 7:
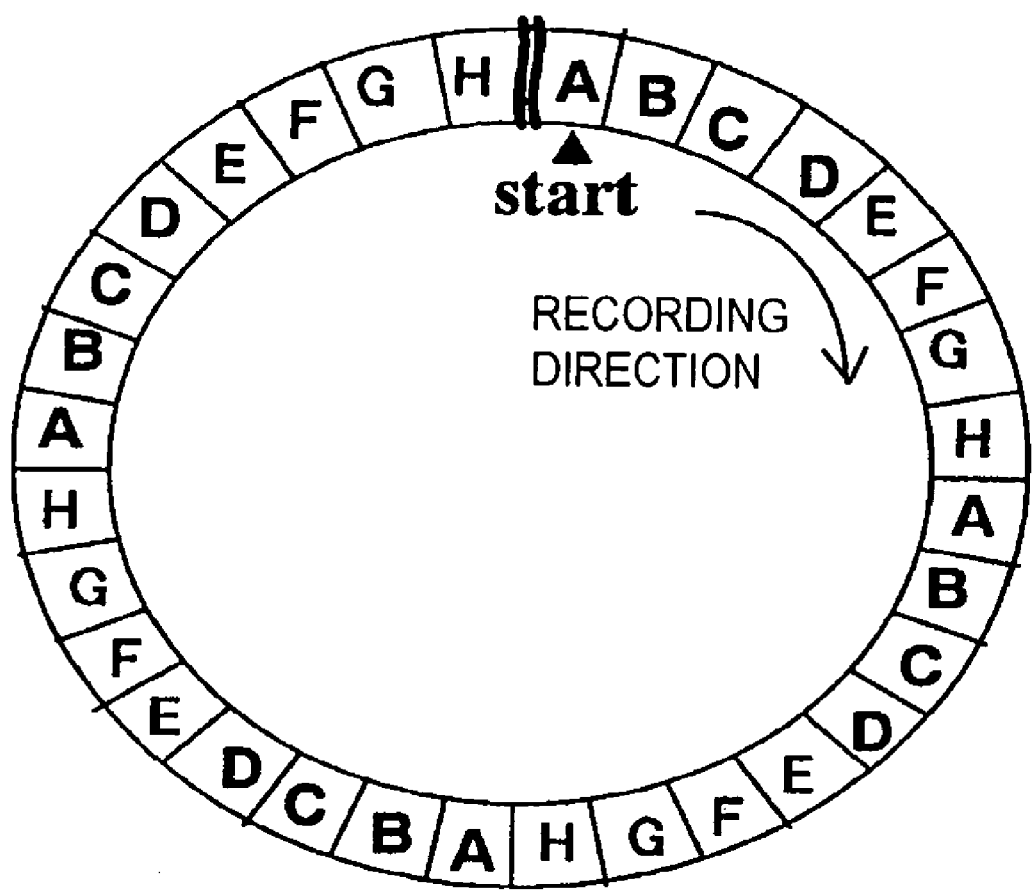
FIG. 7 is a schematic view for describing test data recording performed on an optical disc at a plurality of test recording powers by the first embodiment of the recording power determination method according to the present invention.

The recording data generation section 114 generates test data, and outputs a signal 115 indicating the generated test data to the laser driving circuit 112. The laser driving circuit 112 drives the optical head 102 to record the test data over substantially one circle of the track continuously from a predetermined position in the recording power determination area of the optical disc 101. The recording data generation section 114 generates the test data such that the optical head 102 continuously forms 8T marks and 8T spaces on the optical disc 101. The test data is repeatedly recorded over substantially one circle of the optical disc 101 at the test recording powers A through H. FIG. 7 shows areas of the optical disc 101 corresponding to the test recording powers A through H with letters through "H". By recording the data over substantially one circle of the optical disc 101 a plurality of times repeatedly, the influence of tilts dispersed in the circumferential direction of the optical disc 101 can be removed.

Returning to FIG. 6, when the recording of the test data is finished, as shown in S16 of FIG. 6, the optical head 102 irradiates the optical disc 101 with an optical beam, having a reproduction power. By this, the test data recorded on the track of the optical disc 101 is read, and a signal indicating the test data is generated. The amplitude of the signal generated by the optical head 102 changes in accordance with whether or not the marks are formed on the optical disc 101. The signal 103 generated by the optical head 102 is input to the reproduction section 104.

As shown in FIG. 3, the preamplifier 201 of the reproduction section 104 amplifies the signal 103. The sampling and holding circuit 202 holds the peak value and the bottom value of the signal amplified by the preamplifier 201. The A/D converter 203 digitizes the peak value and the bottom value of the signal held by the sampling and holding circuit 202. The arithmetic operator 204 performs an arithmetic operation on the digitized peak value and bottom value to obtain a modulation factor of the signal. Since the amplitude of the signal 703 is different in accordance with the test recording powers A through H, the modulation factor is also different in accordance with the test recording powers A through R. The arithmetic operator 204 generates a signal 107 indicating the modulation factor of the signal, and outputs the signal 107 to the recording power determination device 108.

As shown in FIG. 5, the signal 107 indicating the modulation factor corresponding to each of the test recording powers A through H is input to the input section 401 of the recording power determination device 108 from the arithmetic operator 204 of the reproduction section 104.

As shown in S18 of FIG. 6, the calculation section 402 of the recording power determination device 108 calculates a product of the modulation factor corresponding to the test recording power A and the square of the test recording power A. The calculation section 402 also calculates a product of the modulation factor corresponding to each of the test recording powers B through H and the square of each of the test recording powers B through H. Thus, the calculation section 402 obtains a plurality of products corresponding to the test recording powers A through H.

Next, as shown in S20 of FIG. 6, the calculation section 402 calculates a first recording power based on the correlation between the plurality of test recording powers A through H and the plurality of products. Specifically, the calculation section 402 creates an approximate line indicating the correlation between the plurality of test recording powers and the plurality of products, and sets the recording power at which the product is 0 on the approximate line as the first recording power. Hereinafter, this will be described in detail with reference to FIG. 8.

Figure 8A:
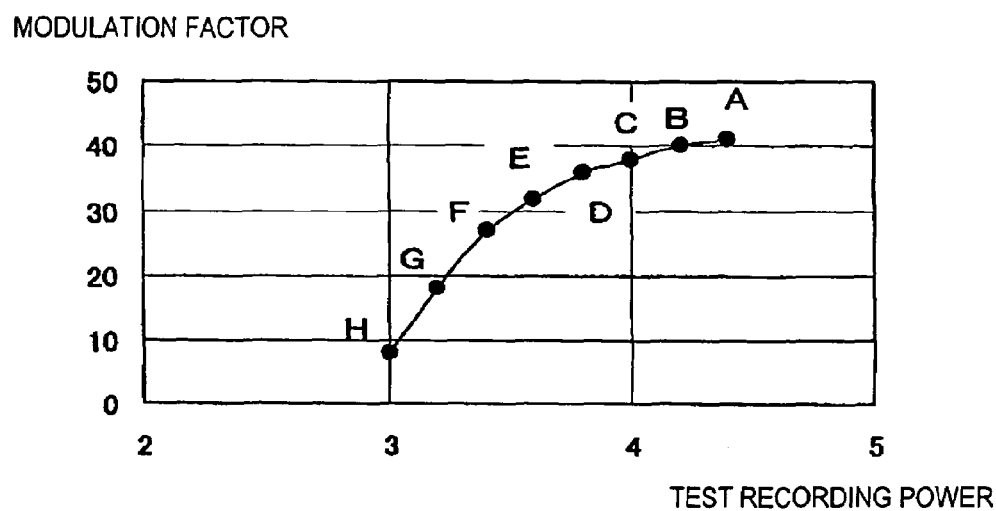
FIG. 8(a) is a graph illustrating the relationship between the test recording power and the modulation factor.
Figure 8B:
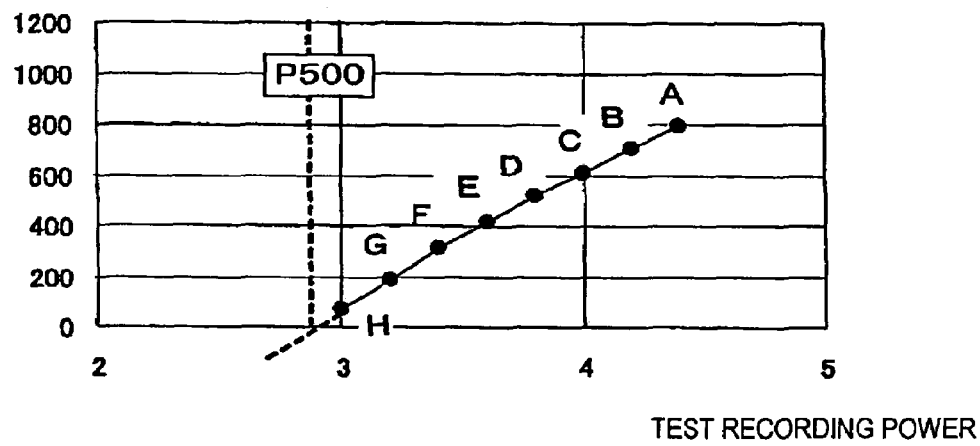
FIG. 8(b) is a graph illustrating the relationship between (i) the test recording power and (ii) the product of the modulation factor and the square of the test recording power.

FIG. 8(a) is a graph illustrating the relationship between the test recording power and the modulation factor corresponding to the test recording power. FIG. 8(b) is a graph illustrating the relationship between (i) the test recording power and (ii) the product of the modulation factor and the square of the test recording power. As is clear from FIGS. 8(a) and 8(b), the linearly of the correlation between the test recording power and the modulation factor is low, whereas the linearly of the correlation between (i) the test recording power and (ii) the product of the modulation factor and the square of the test recording power is high. In the graph of FIG. 8(b), the eight points corresponding to the test recording powers A through H are arranged substantially on a straight line.

The calculation section 402 calculates a recording power P500 at which the product of the modulation factor and the square of the test recording power is 0 on the approximate line shown in the graph of FIG. 8(b).

Next, as shown in S22 of FIG. 6, the calculation section 402 calculates the recording power based on the recording power P500. Specifically, the calculation section 402 performs an arithmetic operation on the recording power P500 and a predetermined value recorded on the optical disc 101, so as to calculate the recording power.

The output section 403 outputs a signal 109 indicating the recording power calculated by the calculation section 402 to the recording power setting section 110.

A program may be used such that a CPU (not shown) controls the elements of the optical disc apparatus 100 in the above-described procedure. The program may be stored on a computer-readable recording medium (not shown), such as an EEPROM, ROM, RAM, hard disc, magnetic recording medium or the like.

Next, with reference to FIG. 9, the relationship between the recording power and the modulation factor in the case where there is a relative tilt between the optical disc 101 and the optical head 102 will be described.

Figure 9A:
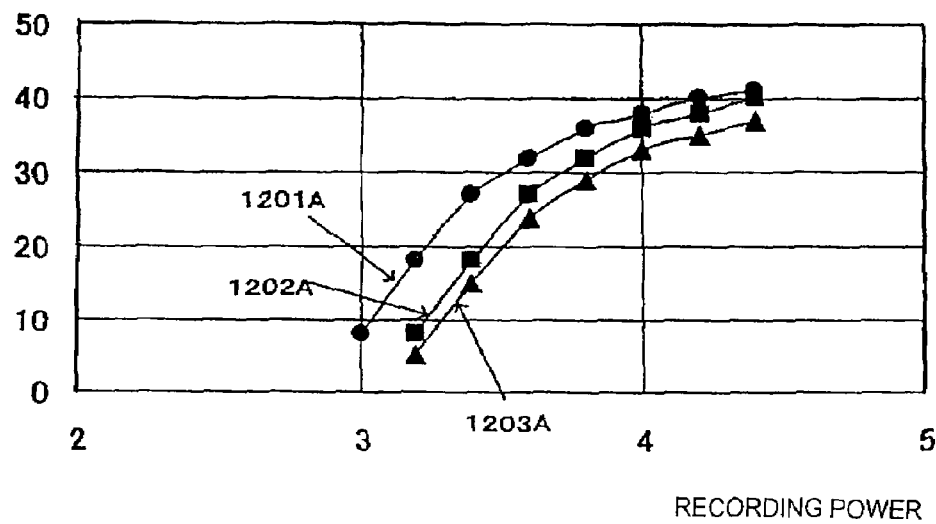
FIG. 9(a) is a graph illustrating the relationship between, the recording power and the modulation factor.
Figure 23:
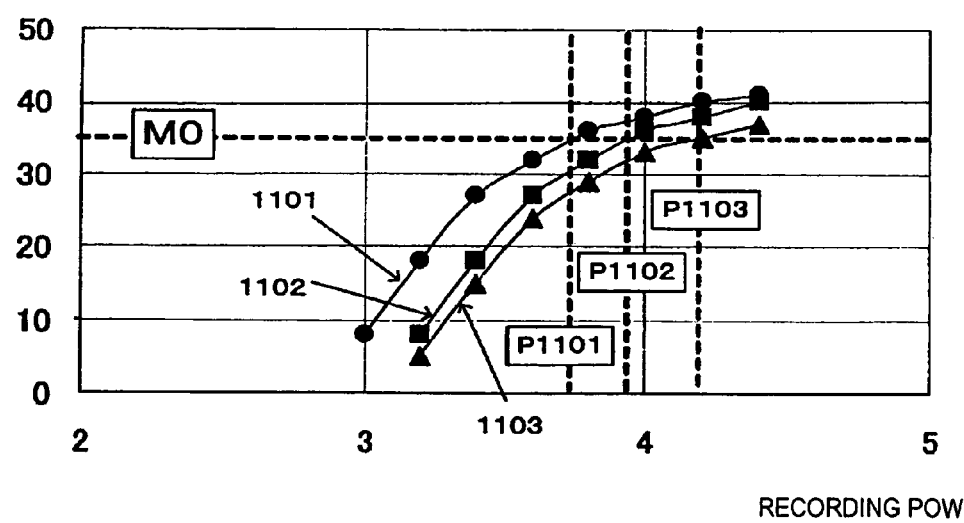
FIG. 23 shows a view for describing an influence of a tilt according to the first conventional recording power determination method and is a graph illustrating the relationship between the recording power and the modulation factor.
Figure 24:
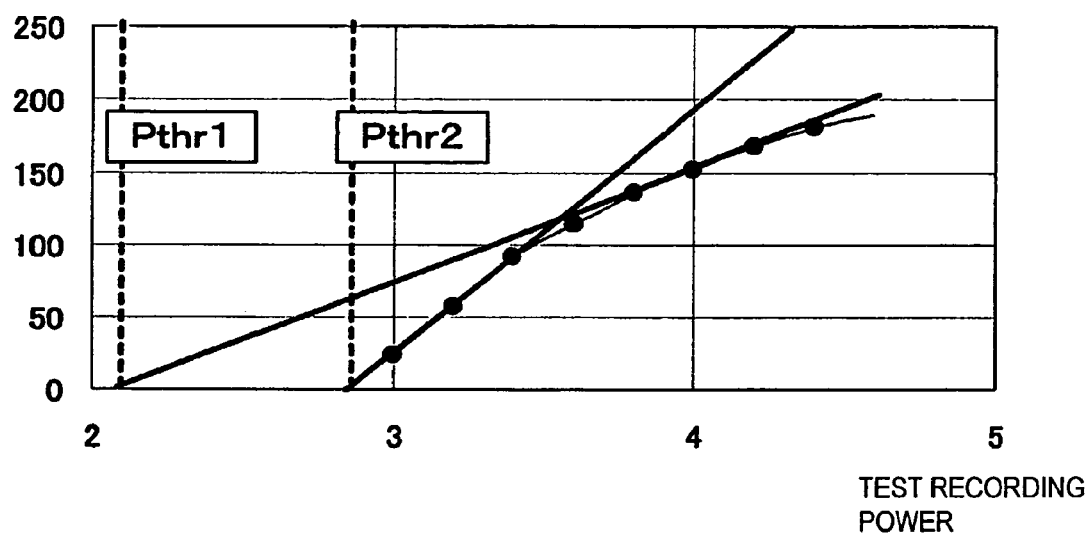
FIG. 24 shows a view for describing the second conventional recording power determination method and is a graph illustrating the relationship between (i) the test recording power and (ii) the product of the modulation factor and the test recording power.

FIG. 9(a) is a graph illustrating the relationship between the recording power and the modulation factor corresponding to the recording power, and is similar to FIG. 23. In the graph of FIG. 9(a), a solid line 1201A represents the result obtained when there is no tilt at the time of data recording or at the time of reading of the recorded data. A solid line 1202A represents the result obtained when there is a tilt at the time of data recording, but there is no tilt at the time of data reading. A solid line 1203A represents the result obtained when there is a tilt both at the time of data recording and at the time of data reading. The modulation factor is smaller when there is a tilt than when there is no tilt. In the case where there is no tilt at the time of data reading but there is a tilt at the time of data recording, the modulation factor corresponding to the test recording power H, which is smallest among the eight test recording powers, cannot be measured. Similarly, in the case where there is a tilt both at the time of data recording and at the time of data reading, the modulation factor corresponding to the test recording power H cannot be measured.

Figure 9B:
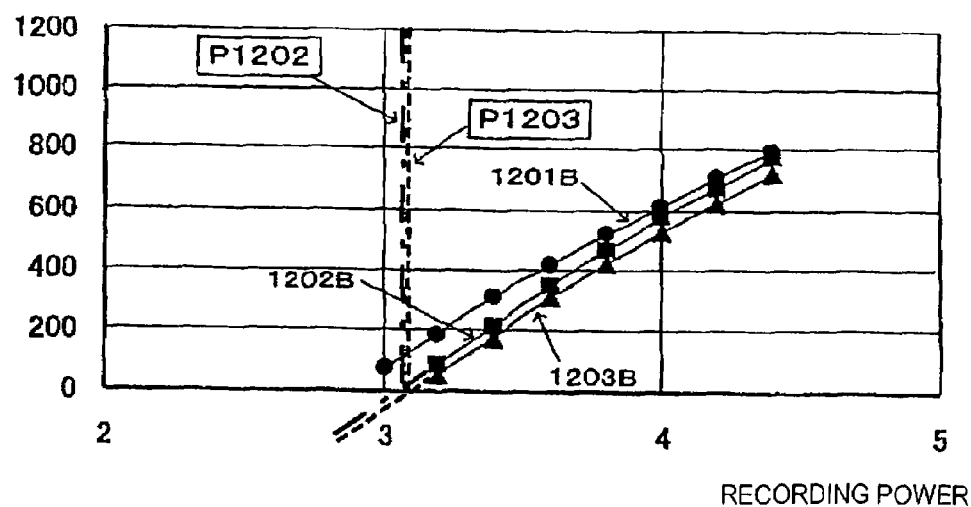
FIG. 9(b) is a graph illustrating the relationship between (i) the recording power and (ii) the product of the modulation factor and the square of the recording power.

FIG. 9(b) is a graph illustrating the relationship between (i) the recording power shown in FIG. 9(a) and (ii) the product of the modulation factor shown in FIG. 9(a) and the square of the recording power. In the graph of FIG. 9(b), a solid line 1201B represents the result obtained when there is no tilt at the time of data recording or at the time of reading of the recorded data. A solid line 1202B represents the result obtained when there is a tilt at the time of data recording, but there is no tilt at the time of data reading. A solid line 1203B represents the result obtained when there is a tilt both at the time of data recording and at the time of data reading.

As described above, test data is recorded and read, before user data is recorded. The test data is read immediately after being recorded. Accordingly, when the test data is recorded and read while there is a relative tilt, the results represented by the solid lines 1203A and 1203B are obtained.

According to this embodiment, as shown in FIG. 9(b), the recording power determination device 108 calculates a recording power P1203 at which the product of the modulation factor and the square of the test recording power is 0, calculates the recording power based on the recording power P1203 and a predetermined value recorded on the optical disc 101, and outputs a signal 109 indicating the calculated recording power to the recording power setting section 110. The result represented by the solid line 1203B is influenced by the tilt at the time of recording and also by the tilt at the time of reading. As described above, only the influence of the tilt at the time of recording needs to be considered for determining the recording power. Therefore, the recording power to be selected at this point is essentially, the recording power P1202, but the recording, power P1203 selected by the recording power determination method of this embodiment is experimentally confirmed to be generally equal to the recording power P1202 to be selected, as shown in FIG. 9(b).

Namely, the recording power at which the product of the modulation factor and the square of the recording power is 0 is a critical recording power necessary for forming marks on the optical disc 101. When a recording power larger than the critical recording power is used, a modulation factor which is not 0 is measured regardless of whether there is a tilt or not at the time of reading. Therefore, the recording power at which the product of the modulation factor and the square of the recording power is 0 is the same regardless of whether there is a tilt or not at the time of reading.

As described above, according to this embodiment, even where there is a relative tilt between the optical disc and the optical head, an appropriate recording power can be determined and thus data can be properly recorded. According to this embodiment, the optical disc is prevented from being deteriorated unnecessarily quickly by repeated recording.

According to this embodiment, an appropriate recording power can be determined against any stress which deteriorates the modulation factor both at the time of recording and at the time of reproduction, not limited to against a tilt.

This embodiment is especially effective in an optical disc apparatus conformed to the BD (Blu-ray Disc) format which requires more precise recording power control for higher density recording.

Disc manufacturers which manufacture optical discs conformed to the BD format determine in advance the recording power Pwo which is recommended for data recording on an optical disc before shipping the optical discs. The recording power Pwo is determined such that when an ideal optical disc apparatus records data on an ideal optical disc at the recording power Pwo and then reads the data, an appropriate modulation factor is measured. However, due to the individual differences among actual optical discs and optical disc apparatuses, even when an optical disc apparatus records data at the recording power Pwo, an appropriate modulation factor is not necessarily measured when the data is read.

Accordingly, for recording data on an optical disc, an optical disc apparatus determines an appropriate recording power after checking the relationship between each of a plurality of test recording powers and a modulation factor corresponding thereto. The disc manufacturers pre-store constant parameters used for determining an appropriate recording power on the optical disc. The constant parameters are Pind, $\rho$, $\kappa$, and Mind. Although these will be described later in detail, an appropriate recording power for recording data on an optical disc is obtained using a recording power Pind which is smaller than the recording power Pwo, and the relationship between the recording power Pind and a modulation factor Mind. It is not recommended to directly determine the recording power Pwo for the following reasons: (1) since the modulation factor saturates in the vicinity of the recording power Pwo, it is difficult to detect a change in the optimum recording power caused by an external disturbance such as a tilt or the like as described above with reference to FIG. 9; and (2) the repeated determination of the recording power results in the deterioration, of the optical disc 101.

Hereinafter, with reference to FIGS. 10 and 11, the relationship among the recording power Pwo recommended by the optical disc manufactures, Pind, ρ, κ, and Mind will be described.

The disc manufacturers determine the recording power Pwo, then determine the recording power Pind, and determine ρ based on the relationship of ρ=recording power Pwo/recording power Pind.

Figure 10:
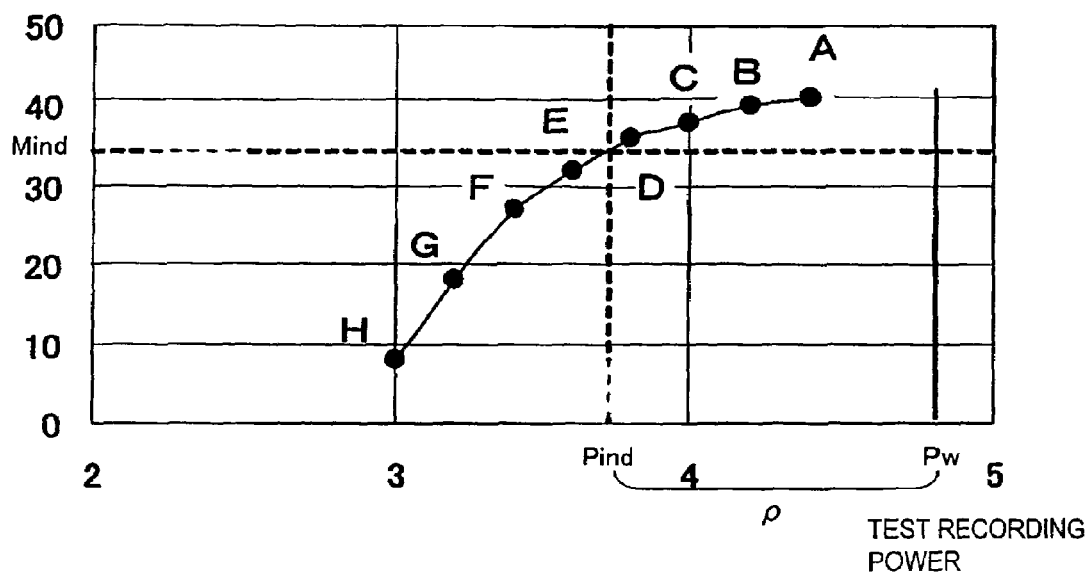
FIG. 10 shows a view for describing the first embodiment of the recording power determination method according to the present invention and is a graph illustrating the relationship between the test recording power and the modulation factor.

As shown in FIG. 10, the disc manufacturers read data recorded at the recording power Pind so as to form 8T marks and set the modification factor of the signal corresponding to the data as the modification factor Mind.

Figure 11:
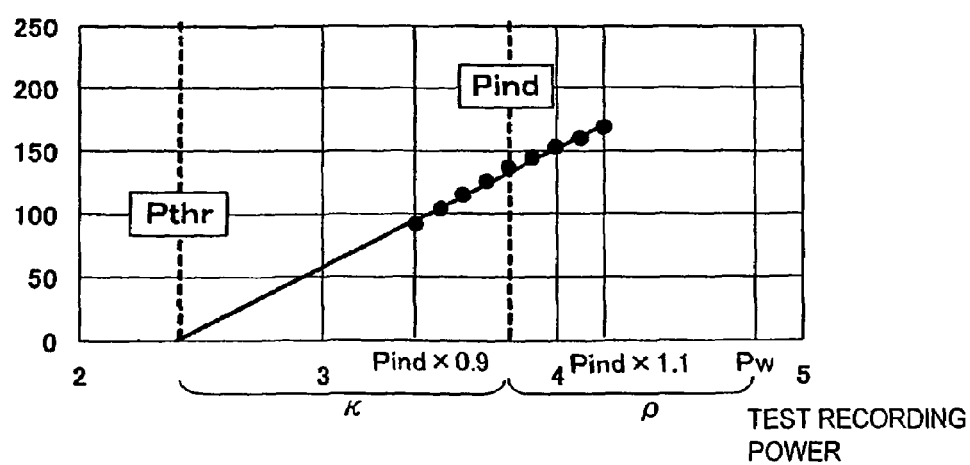
FIG. 11 shows a view for describing the first embodiment of the recording power determination method according to the present invention and is a graph illustrating the relationship between (i) the test recording power and (ii) the product of the modulation factor and the test recording power.

As shown in FIG. 11, the disc manufacturers read test data recorded at a plurality of test recording powers within a range of 0.9 times to 1.1 times the recording power Pind so as to form 8T marks, generate a signal, and measure a plurality of modulation factors of the signal. The plurality of modulation factors respectively correspond to the plurality of test recording powers.

The disc manufacturers calculate a product of each test recording power and a modulation factor corresponding thereto, and calculate a recording power Pthr based on the correlation between the plurality of test recording powers and the plurality of products. Specifically, an approximate line indicating the correlation between the plurality of test recording powers and the plurality of products is created, and the recording power at which the product is 0 on the approximate line is set as the recording power Pthr. Then, the value of κ is determined based on the relationship of κ=recording power Pind/recording power Pthr.

The disc manufacturers pre-store the value of Pind, the value of ρ, the value of κ, and the value of Mind on the optical disc 101.

In this embodiment, a value corresponding to the recording power Pthr at which the modulation factor is 0 is calculated based on the relationship between the test recording power and the modulation factor, the recording power (i.e., the value corresponding to Pind) is calculated base on the value of the recording power Pthr and the value of κ, and the recording power Pw is calculated based on the value of the calculated recording power and the value of ρ.

Hereinafter, a recording power determination method of this embodiment in the case where the optical disc is conformed to the BD format will be described.

The reproduction section 104 reads the value of κ and the value of ρ recorded on the optical disc 101, and outputs a signal 105 indicating the value of κ and the value of ρ to the recording power determination device 108.

After the recording section 210 of the optical disc apparatus 100 records test data at the test recording powers A through H, the reproduction section 104 measures a plurality of the modulation factors corresponding to the plurality of test recording powers. The reproduction section 104 outputs a signal 107 indicating the plurality of modulation factors corresponding to the plurality of test recording powers to the recording power determination device 108.

When the result as shown in FIG. 8(a) is obtained by reading the test data, the recording power determination device 108 calculates a recording power P500 at which the product of the modulation factor and the square of the recording power is 0 as shown in FIG. 8(b), and calculates a recording power Pw1 for recording data in accordance with the following expression 1.

$$Pw1 = P500 \times (-1/\kappa + 2) \times \rho \quad \text{expression 1}$$

The recording power determination device 108 outputs a signal 109 indicating the calculated recording power Pw1 to the recording power setting section 110.

As described above, according to this embodiment, since the linearity of the correlation between (i) the test recording power and (ii) the product of the modulation factor and the square of the test recording power is high, an appropriate recording power can be determined without relying on the range of the test recording powers.

In the above description, the first recording power (P500) is calculated using the product of the modulation factor and the square of the test recording power, i.e., the product in the case where the value of exponent n of the test recording power is 2. The present invention is not limited to this. Depending on the structure of the optical disc or the characteristics of the recording film of the optical disc, the linearity of the correlation between (i) the test recording power and (ii) the product of the modulation factor and the n'th power of the test recording power may be high in the case where the value of exponent n is not 2. Accordingly, the value of exponent n is not limited to 2.

Figure 22:
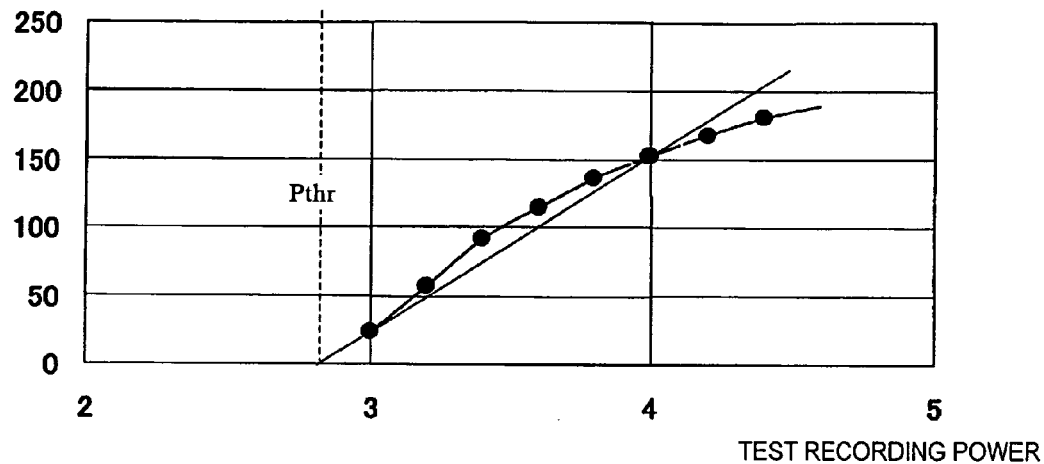
FIG. 22 shows a view for describing a second conventional recording power determination method and is a graph illustrating the relationship between (i) the test recording power and (ii) the product of the modulation factor and the test recording power.

It should be noted though that as described above with reference to FIG. 22, such a linearity when the value of exponent is 1, i.e., the linearity of the correlation between (i) the test recording power and (ii) the product of the modulation factor and the test recording power, is low. In the graph of FIG. 22, the plotted points are off the straight line.

Accordingly, the value of exponent n is any real number other than 1. Experiments were performed on the value of exponent n using several existent optical discs. When, for example, the value of exponent n is 1.5 to 2.5, the linearity of the correlation between (i) the test recording power and (ii) the product of the modulation factor and the n'th power of the test recording power was high. However, the value of exponent n is not limited to these values, and may be 0.5, 0 or −1, for example.

According to this embodiment, the linearity of the correlation between (i) the test recording power and (ii) the product of the modulation factor and the n'th power of the test recording power can be made high. Therefore, a recording power at which the product of the modulation factor and the n'th power of the test recording power is 0 can be calculated regardless of the test recording power.

The appropriate recording power P500 can be obtained without recording data at eight test recording powers A through H as shown in FIG. 7. The appropriate recording power P500 can be obtained by recording data at four recording powers A through D, four recording powers E through H, or four recording powers C through F. When determining a recording power using, a predetermined width of area, the number of repetitions can be increased and thus the precision of the recording; power to be determined can be increased by decreasing; the number of the test recording powers.

It is preferable that the value of exponent n is recorded on the optical disc 101. By recording the value of exponent n on the optical disc 101, the degree of freedom for designing the structure of the optical disc apparatus 101 or the recording film in the optical disc 101 can be enhanced.

The recording power determination method of this embodiment is especially effective in an optical disc apparatus required to control the recording power at higher precision for higher density recording, such as an optical disc apparatus conformed to the BD format.

Embodiment 2

Hereinafter, Embodiment 2 of a recording power determination method and a power determination device according to the present invention will be described with reference to FIG. 12.

A recording power determination device 108 of this embodiment has substantially the same structure as that of the recording power determination device described in Embodiment 1 with reference to FIG. 5. An optical disc apparatus 100 including the recording power determination device 108 of this embodiment also has substantially the same structure as that of the optical disc apparatus described in Embodiment 1 with reference to FIG. 2. In order to avoid redundancy, the recording power determination device 108 and the optical disc apparatus 100 of this embodiment will not be described regarding the points which are the same as those of Embodiment 1.

Unlike in Embodiment 1, the recording power determination device 108 of this embodiment calculates a product of the modulation factor and an n'th power of the test recording power regarding each of a plurality of values of exponent n, calculates the linearity of the correlation between (i) the test recording power and (ii) the product of the modulation factor and the n'th power of the test recording power, and determines the recording: power using one of the plurality of values of exponent n which corresponds to the highest linearity.

Hereinafter, a recording power determination method when the values of exponent n are 2 and 3 will be described with reference to FIGS. 2 and 5.

The reproduction section 104 outputs a signal 107 indicating a plurality of modulation factors corresponding to the plurality of test recording powers to the recording power determination device 108. The signal 107 indicating the modulation factors corresponding to the test recording powers A through H is input to the input section 401 of the recording power determination device 108 from the arithmetic operator 204 of the reproduction section 104.

The calculation section 402 calculates a product of the modulation factor corresponding to the test recording power A and the square of the test recording power A. The calculation section 402 calculates a product of the modulation factor corresponding to each of the test recording powers B through H and the square of each of the test recording powers B through. B. Thus, the calculation section 402 obtains a plurality of products corresponding to the test recording powers A through H in the case where the value of exponent n is 2.

The calculation section 402 also calculates a product of the modulation factor corresponding to the test recording power A and the cube of the test recording power A. The calculation section 402 calculates a product of the modulation factor corresponding to each of the test recording powers B through H and the cube of each of the test recording powers B through H. Thus, the calculation section 402 obtains a plurality of products corresponding to the test recording powers A through H in the case where the value of exponent n is 3.

Figure 12A:
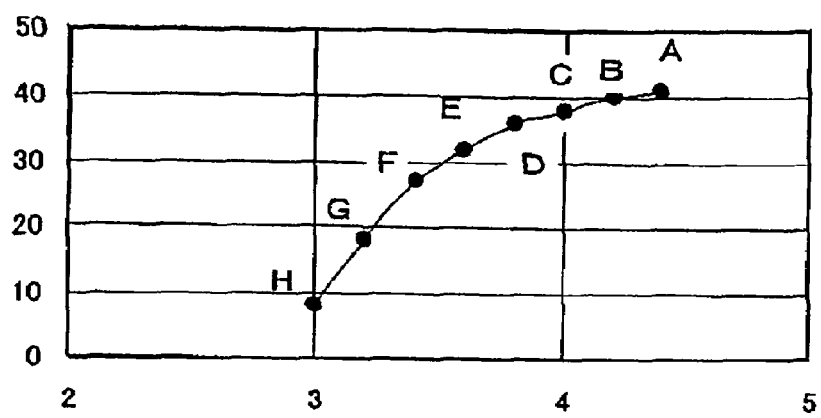
FIG. 12(a) is a graph illustrating the relationship between the test recording power and the modulation factor.

FIG. 12($a$) is a graph illustrating the relationship between the test recording power and the modulation factor corresponding to the test recording power. FIG. 12($b$) is a graph illustrating the relationship between (i) the test recording power and (ii) the product of the modulation factor and the square of the test recording power. FIG. 12($c$) is a graph illustrating the relationship between (i) the test recording power and (ii) the product of the modulation factor and the cube of the test recording, power.

The calculation section 402 compares the linearity obtained when the value of exponent n is 2 and the linearity obtained when the value of exponent n is 3, and determines which linearity is higher. The comparison on linearity will be described later. Here, when, for example, the linearity obtained when the value of exponent n is 2 is higher than the linearity obtained when the value of exponent n is 3, the calculation section 402 calculates a recording power P500 based on the correlation between the plurality of test recording powers A through H and the plurality of products corresponding thereto (calculated above) in the case where the value of exponential n is 2. Specifically, the calculation section 402 creates an approximate line indicating the correlation between the plurality of test recording powers and the plurality of products, and calculates the recording power P500 at which the product is 0 on the approximate line. Then, the calculation section 402 performs an arithmetic operation on the recording power P500 and a predetermined value read from the optical disc 101 so as to calculate the recording power. The output section 403 outputs a signal 109 indicating the calculated recording power to the recording power setting section 110, and the recording power setting. 110 sets the recording power in the laser driving circuit 112.

With reference to FIGS. 12($b$) and 12($c$), the comparison on linearity will be described.

When the value of exponent is 2, the calculation section 402 calculates the linearity of the correlation between (i) the test recording power and (ii) the product of the modulation factor and the square of the test recording power. For example, the calculation section 402 selects the largest two among the test recording powers A through H (the test recording powers A and B) and the smallest two among the test recording, powers A through H (the test recording powers G and H). Referring to the graph of FIG. 12($b$), the calculation section 402 creates a straight line connecting the point corresponding to the test recording power A and the point corresponding the test recording power B (hereinafter, this straight line will be referred to as a "first straight line"), and calculates the gradient of the first straight line (hereinafter, referred to as a "first gradient"). Also referring to the graph of FIG. 12($b$), the calculation section 402 creates a straight line connecting the point corresponding to the test recording power G and the point corresponding to the test recording power H (hereinafter, this straight line will be referred to as a "second straight line"), and calculates the gradient of the second straight line (hereinafter, referred to as a "second gradient"). The calculation section 402 calculates the ratio between the first gradient and the second gradient (hereinafter, this ratio will be referred to as a "first ratio").

When the value of exponent is 3 also, the calculation section 402 calculates the linearity of the correlation between (i) the test recording power and (ii) the product of the modulation factor and the cube of the test recording power. For example, the calculation section 402 selects the largest two among: the test recording powers A through H (the test recording powers A and B) and the smallest two among the test recording powers A through H (the test recording powers G and Referring to the graph of FIG. 12($c$), the calculation section 402 creates a straight line connecting the point corresponding to the test recording power A and the point corresponding to the test recording power B (hereinafter, this straight line will be referred to as a "third straight line"), and calculates the gradient of the third straight line (hereinafter, referred to as a "third gradient"). Also referring to the graph of FIG. 12($c$), the calculation section 402 creates a straight line connecting the point corresponding to the test recording power G and the point corresponding to the test recording power (hereinafter, this straight line will be referred to as a "fourth straight line"), and calculates the gradient of the fourth straight line (hereinafter, referred to as a "fourth gradient"). The calculation section 402 calculates the ratio between the third gradient and the fourth gradient (hereinafter, this ratio will be referred to as a "second ratio").

Then, the calculation section 402 compares the first ratio and the second ratio, and determines that a linearity of the value of exponent value corresponding to one of the first ratio and the second ratio, which is closer to ratio 1, is higher. Then, as described above, the calculation section 402 calculates the recording power based on the correlation corresponding to the value of exponent value providing the higher linearity. Since the calculation section 402 determines the recording power based on the correlation corresponding to the value of exponent value providing the higher linearity, a more appropriate recording power can be determined.

However, the method for comparison on linearity is not limited to this. In the above description, the calculation section 402 compares the gradient in the vicinity of the maximum value among the plurality of test recording powers and the gradient in the vicinity of the minimum value among the plurality of test recording powers. The calculation section 402 may use a different method as described, below to compare the gradient in the vicinity of the maximum value and the gradient in the vicinity of the minimum value among the plurality of test recording powers.

When the value of exponent n is 2, the calculation section 402 calculates a first average power, which indicates an average of all the plurality of test recording powers. Next, the calculation section 402 selects at least two test recording powers as test recording powers belonging to one group of test recording powers (hereinafter, referred to as a "first test recording power group") from the plurality of test recording powers. The test recording powers belonging to the first test recording power group are selected such that an average of such test recording powers is larger than the first average power. Then, the calculation section 402 creates a first straight line indicating the correlation between the test recording powers belonging to the first test recording power group and the products corresponding to these test recording powers, and calculates a first gradient of the first straight line. Further, the calculation section 402 selects at least two test recording powers as test recording powers belonging to another group of test recording powers (hereinafter, referred to as a "second test recording power group") from the plurality of test recording powers. The test recording powers belonging to the second test recording power group are selected such that an average of such test recording powers is smaller than the first average power. Then, the calculation section 402 creates a second straight line indicating the correlation between the test recording powers belonging to the second test recording power group and the products corresponding to these test recording powers, and calculates a second gradient of the second straight line. Then, the calculation section 402 calculates a first ratio based on the first gradient and the second gradient.

When the value of exponent n is 3 also, the calculation section 402 calculates a second average power, which indicates an average of all the plurality of test recording powers. Next, the calculation section 402 selects at least two test recording powers as test recording powers belonging to one group of test recording powers (hereinafter, referred to as a "third test recording power group") from the plurality of test recording, powers. The test recording powers belonging to the third test recording power group are selected such that an average of such test recording powers is larger than the second average power. Then, the calculation section 402 creates a third straight line indicating the correlation between the test recording powers belonging to the third test recording power group and the products corresponding to these test recording powers, and calculates a third gradient of the third straight line. Further, the calculation section 402 selects at least two test recording powers as test recording powers belonging to another group of test recording powers (hereinafter, referred to as a "fourth test recording power group") from the plurality of test recording powers. The test recording powers belonging to the fourth test recording power group are selected such that an average of such test recording powers is smaller than the second average power. Then, the calculation section 402 creates a fourth straight line indicating the correlation between the test recording powers belonging to the fourth test recording power group and the products corresponding to these test recording powers, and calculates a fourth gradient of the fourth straight line. Then, the calculation section 402 calculates a second ratio based on the third gradient and the fourth gradient.

Next, the calculation section 402 determines that a linearity of the value of exponent value corresponding to one of the first ratio and the second ratio, which is closer to ratio 1, is higher.

As described above, among the plurality of values of exponent n, the value providing the higher linearity may be selected.

The method for comparison on linearity in this embodiment is not limited to the above. The calculation section 402 may perform the comparison on linearity as follows. Regarding each of the plurality of values of exponent n, the calculation section 402 sets one test recording power group including at least two test recording powers among the plurality of test recording powers, sets another test recording power group including at least two test recording powers among the plurality of test recording powers, such that the test recording powers in the two test recording power groups are not completely the same. Then, the calculation section 402 creates a straight line for each test recording power group, and calculates the gradient of each straight line. The comparison on linearity may thus be performed.

In more detail, regarding the value of exponent of 2, the calculation section 402 selects at least two test recording powers among the plurality of test recording powers, so as to set a first test recording power group including the selected at least two test recording powers. Then, the calculation section 402 creates a first straight line based on all the test recording powers of the first test recording power group and the products corresponding to all the test recording powers of the first test recording power group, and calculates a first gradient of the first straight line. Regarding the value of exponent of 2, the calculation section 402 selects at least two test recording powers among the plurality of test recording powers such that these test recording powers are not completely the same as those included in the first test recording power group, so as to set a second test recording power group including, the selected at least two test recording powers. Then, the calculation section 402 creates a second straight line based on all the test recording powers of the second test recording power group and the products corresponding to all the test recording powers of the second test recording power group, and calculates a second gradient of the second straight line. Then, the calculation section 402 calculates a first ratio based on the first gradient and the second gradient.

Regarding the value of exponent of 3 also, the calculation section 402 selects at least two test recording powers among the plurality of test recording powers, so as to set a third test recording power group including the selected at least two test recording powers. Then, the calculation section 402 creates a third straight line based on all the test recording powers of the third test recording power group and the products corresponding to all the test recording powers of the third test recording power group, and calculates a third gradient of the third straight line. Regarding the value of exponent of 3, the calculation section 402 selects at least two test recording powers among the plurality of test recording powers such that these test recording powers are not completely the same as those included in the third test recording power group, so as to set a fourth test recording power group including the selected at least two test recording powers. Then, the calculation section 402 creates a fourth straight line based on all the test recording powers of the fourth test recording power group and the products corresponding to all the test recording powers of the fourth test recording power group, and calculates a fourth gradient of the fourth straight line. Then, the calculation section 402 calculates a second ratio based on the third gradient and the fourth gradient.

The calculation section 402 compares the first ratio and the second ratio, and thus determines one of the first value and the second value which corresponds to the higher linearity.

In the above, a plurality of methods for comparison have been described. In any method for comparison, when one ratio is equal to or greater than 1 and the other ratio is equal to or less than 1, the calculation method 402 may calculate the inverse number of the ratio which is equal to or greater than 1 to make both ratios equal to or less than 1, and select a value closer to 1 in this state. Alternatively, when one ratio is equal to or greater than 1 and the other ratio is equal to or less than 1, the calculation method 402 may calculate the inverse number of the ratio which is equal to or less than 1 to make both ratios equal to or greater than 1, and select a value closer to 1 in this state.

The above-described plurality of methods for comparison on linearity are merely exemplary. Any method may be used as long as the comparison on linearity of the correlation can be performed.

As described in Embodiment 1, when the value of exponent n is 3 also, the recording power at which the product of the modulation factor and the cube of the test recording power is 0 is a critical recording power for forming marks on the optical disc 101. When a recording power larger than the critical recording power is used, the modulation factor is measured regardless of whether there is a tilt or not at the time of reading. Therefore, the recording power at which the product of the modulation factor and the cube of the recording power is 0 is the same regardless of whether there is a tilt or not at the time of reading.

Recently, optical discs including a plurality of recording films have been developed. In this embodiment, the value of exponent n can be appropriately determined for each of the plurality of recording films of one optical disc.

In the recording power determination device 108 of this embodiment, the output section 402 outputs a signal to the recording section 210 such that the value, among the plurality of values of exponent n, corresponding to the highest linearity is recorded on the optical disc 101. The recording section 210 records such a value of exponent on the optical disc 101. The optical disc 101 may have an area for recording such a value of exponent in advance. Alternatively, such a value of exponent may be recorded in the user data area of the optical disc 101. In the case where such a value of exponent is recorded in a predetermined area of the optical disc 101 as described above, the optical disc apparatus 100 having such an optical disc 101 mounted thereon reads the value recorded on the optical disc 101 for determining the recording power, and can determine an appropriate recording power quickly using the read value without performing the comparison on linearity.

Alternatively, such a value of exponent may be recorded on the optical disc apparatus 100.

In this embodiment, the optical disc 101 has identification information recorded thereon for identifying the optical disc 101. The identification information is, for example, information regarding the disc manufacturer of the optical disc 101 or information on the lot of the optical disc 101.

The reproduction section 104 reads the identification information recorded on the optical disc 101, and outputs a signal 105 indicating the identification information to the recording power determination device 108.

The signal 105 indicating the identification information is input to the input section 401 of the recording power determination device 108. The memory 404 of the recording power determination device 108 includes an identification information storage section. After the value of exponent n of the highest linearity which corresponds to the identification information of the optical disc 101 is determined from the plurality of values, the calculation section 402 stores the identification information of the optical disc 101, and the value of the highest linearity corresponding to the identification information of the optical disc 101, in the identification information storage section of the memory 404.

The identification information of the optical disc 101, and the value of the highest linearity corresponding to the identification information of the optical disc 101, are stored in the memory 404. Therefore, when the optical disc 101 is mounted on the optical disc apparatus 100, the reproduction section 104 reads the identification information of the mounted optical disc 101, and the calculation section 402 of the recording power determination device 108 determines whether or not the read identification information is the same as the identification information stored in the identification information storage section. When determining that the read identification information is the same as the identification information stored in the identification information storage section, the calculation section 402 reads the value of exponent n corresponding to the highest linearity, among the plurality of values, from the memory 404, and can determine an appropriate recording power quickly using the read value, without performing the comparison on linearity on the plurality of values.

This embodiment is especially effective in an optical disc apparatus conformed to the BD format as in Embodiment 1.

As described in Embodiment 1, an optical disc conformed to the BD format has a value of Pind, a value of $\rho$, a value of $\kappa$ and a value of Mind stored thereon in advance. The reproduction section 104 reads the values of $\rho$ and $\kappa$.

Figure 12B:
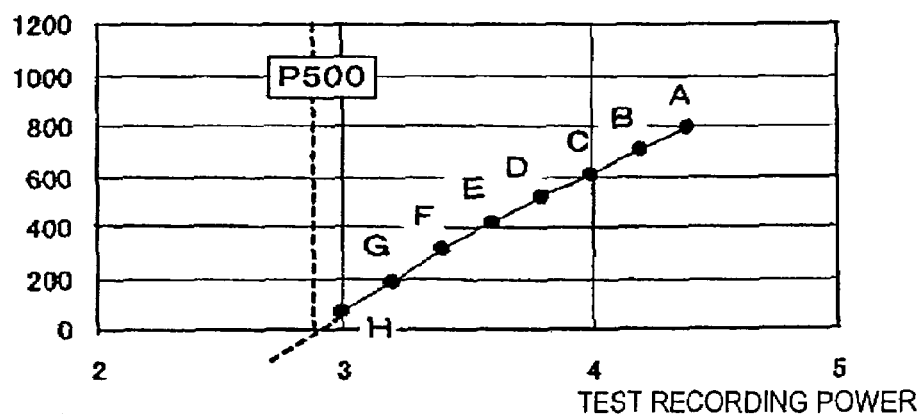
FIG. 12(b) is a graph illustrating the relationship between (i) the test recording power and (ii) the product of the modulation factor and the square of the test recording power.

When the calculation section 402 determines that the linearity obtained when the value of exponent n is 2 is higher, the calculation section 402 calculates a recording power P500 shown in FIG. 12(b) and calculates a recording power Pw1 in accordance with the following expression 1.

$$Pw1 = P500 \times (-1/\kappa + 2) \times \rho \qquad \text{expression 1}$$

Figure 12C:
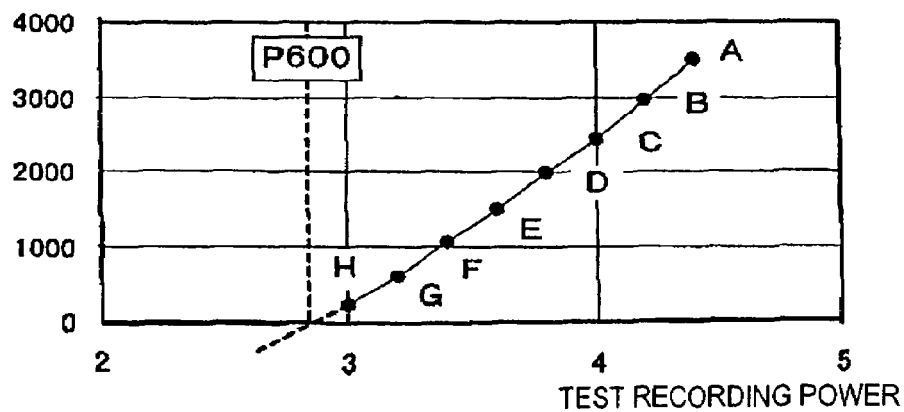
FIG. 12(c) is a graph illustrating the relationship between (i) the test recording power and (ii) the product of the modulation factor and the cube of the test recording power.

By contrast, when the calculation section 402 determines that the linearity obtained when the value of exponent n is 3 is higher, the calculation section 402 calculates a recording power P600 shown in FIG. 12(c) and calculates a recording power Pw1 in accordance with the following expression 2.

$$Pw1 = P600 \times (3\kappa-2)/(2\kappa-1) \times \rho \quad \text{expression 2}$$

The output section 403 outputs a signal 109 indicating the recording power Pw1 to the recording power setting section 110.

In the above description, the values of exponent n are 2 and 3. Depending on the structure of the optical disc or the characteristics of the recording film of the optical disc, the linearity may be high in the case where the value of exponent n is neither 2 nor 3. In this embodiment, the value of exponent n is not limited to 2 or 3, and may be any real number other than 1. For calculating the recording power, the coefficients regarding κ and ρ change in accordance with the value of exponent n. For example, when the value of exponent n is 0, the calculation section 402 calculates the recording power Pw1 in accordance with the following expression 2'.

$$Pw1 = P700 \times (1/(2-\kappa)) \times \rho \quad \text{expression 2'}$$

Here, P700 is obtained as follows. An approximate line indicating the correlation between the plurality of test recording powers and the plurality of products when the value of exponent n is 0 is created, and the recording power at which the product is 0 on the approximate line is P700.

Incidentally, when the value of exponent n is 1, the recording power Pw1 is calculated in accordance with the following expression as described above with reference to FIG. 22.

$$Pw1 = Pthr \times \kappa \times \rho$$

Pthr is obtained as follows. An approximate line indicating the correlation between the plurality of test recording powers and the plurality of products when the value of exponent n is 1 is created, and the recording power at which the product is 0 on the approximate line is Pthr.

In the above description, the comparison on linearity is performed between two values. This embodiment is not limited to this. In this embodiment, the comparison on linearity may be performed among three values or more. For example, the value of exponent corresponding to the highest linearity may be determined among three values of 2, 2.5 and 3.

According to this embodiment, the value of exponent n corresponding to the higher linearity among at least two values is calculated based on the correlation between (i) the test recording power and (ii) the product of the modulation factor and the n'th power of the test recording power (n is a real number other than 1). Thus, an appropriate recording power can be determined without relying on the range of the test recording powers.

Embodiment 3

Hereinafter, Embodiment 3 of a recording power determination method and a recording power determination device according to the present invention will be described with reference to FIG. 14.

A recording power determination device 108 of this embodiment has substantially the same structure as that of the recording power determination device described in Embodiment 1 with reference to FIG. 5. An optical disc apparatus 100 including the recording power determination device 108 of this embodiment also has substantially the same structure as that of the optical disc apparatus described in Embodiment 1 with reference to FIG. 2. In order to avoid redundancy, the recording power determination device 108 and the optical disc apparatus 100 of this embodiment will not be described regarding the points which are the same as those of Embodiment 1.

The recording power determination method of this embodiment will be described with reference to FIG. 13.

As described above, an optical disc 101 conformed to the BD format has values of Pind, ρ, κ and Mind stored thereon in a predetermined area. As shown in S32 of FIG. 13, the reproduction section 104 reads the values of Pind, ρ, κ and Mind from the optical disc 101. Then, the reproduction section 104 outputs a signal 105 indicating the values of Pind, ρ, κ and Mind to the recording power determination device 108.

Figure 13:
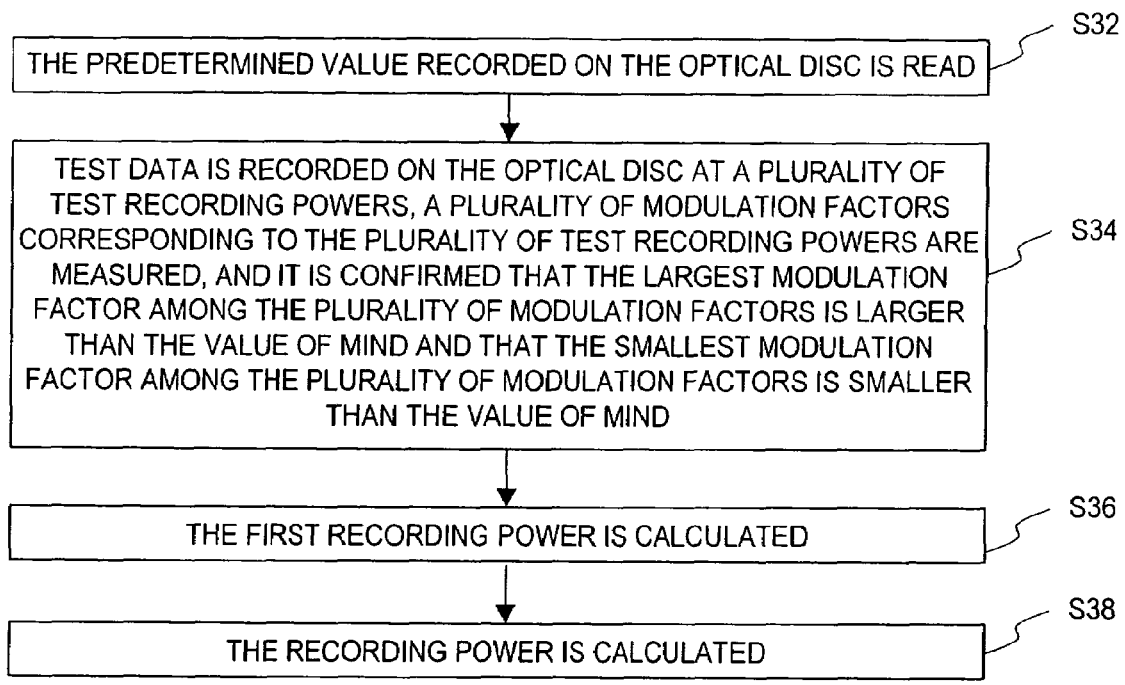
FIG. 13 is a flowchart for describing a third embodiment of a recording power determination method according to the present invention.

As shown in S34 of FIG. 13, the recording power determination device 108 confirms that the largest modulation factor among the plurality of modulation factors is larger than the value of Mind and that the smallest modulation factor among the plurality of modulation factors is smaller than the value of Mind.

Before recording test data, the recording power determination device 108 determines the test recording powers A through H such that the difference between each adjacent test recording powers is equal to or less than 10% of the value of Pind.

After recording the test data at the test recording powers A through H, the reproduction section 104 measures the plurality of modulation factors corresponding to the plurality of test recording powers. The reproduction section 104 outputs a signal 107 indicating the plurality of modulation factors corresponding to the plurality of test recording powers to the recording power determination device 108.

The calculation section 402 of the recording power determination device 108 confirms that the largest modulation factor among the plurality of modulation factors is larger than the value of Mind and that the smallest modulation factor among the plurality of modulation factors is smaller than the value of Mind. Specifically, the calculation section 402 determines whether or not the largest modulation factor is smaller than the value of Mind. When determining that the largest modulation factor is smaller than the value of Mind, the calculation section 402 sets a plurality of test recording powers larger than the previous test recording powers, and the output section 403 outputs a signal 109 indicating the newly set test recording powers to the recording section 210. The recording section 210 records the test data at the newly set test recording powers. The reproduction section 104 reads the newly recorded test data, and the calculation section 402 again determines whether or not the largest modulation factor is smaller than the value of Mind. Until the reproduction section 104 measures a modulation factor larger than the value of Mind, the calculation section 402 sets a plurality of test recording powers larger than the previous test recording powers.

The calculation section 402 also determines whether or not the smallest modulation factor is larger than the value of Mind. When determining that the smallest modulation factor is larger than the value of Mind, the calculation section 402 sets a plurality of test recording powers smaller than the previous test recording powers, and the output section 403 outputs a signal 109 indicating the newly set test recording powers to the recording section 210. The recording section 210 records the test data at the newly set test recording powers. The reproduction section 104 reads the newly recorded test data, and the calculation section 402 again determines whether or not the smallest modulation, factor is larger than the value of Mind. Until the reproduction section 104 measures a modulation factor smaller than the value of Mind, the calculation section 402 sets a plurality of test recording powers smaller than the previous test recording powers.

In this manner, the calculation section 402 confirms that the largest modulation factor is larger than the value of Mind and that the smallest modulation factor is smaller than the value of Mind.

Figure 14A:
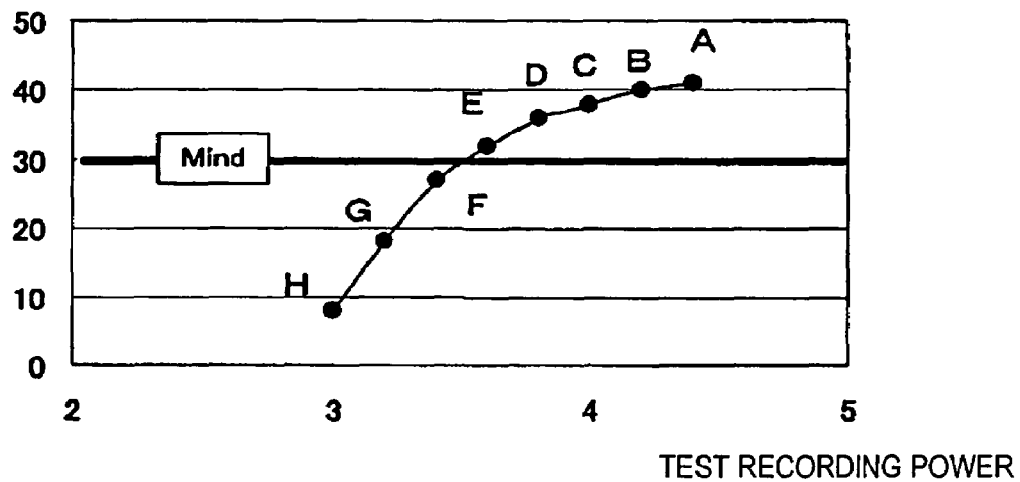
FIG. 14(a) is a graph illustrating the relationship between the test recording power and the modulation factor.

FIG. 14(a) is a graph illustrating the relationship between the test recording power and the modulation factor. The calculation section 402 confirms that the modulation factor corresponding to the smallest test recording power H is equal to or smaller than the value of Mind and that the modulation factor corresponding to the largest test recording power A is larger than the value of Mind as shown in FIG. 14(a).

Next, after confirming that the largest modulation factor is larger than the value of Mind and that the smallest modulation factor is smaller than the value of Mind, the calculation section 402 calculates a product of each of the plurality of modulation factors and the square of each of the plurality of test recording powers.

Figure 14B:
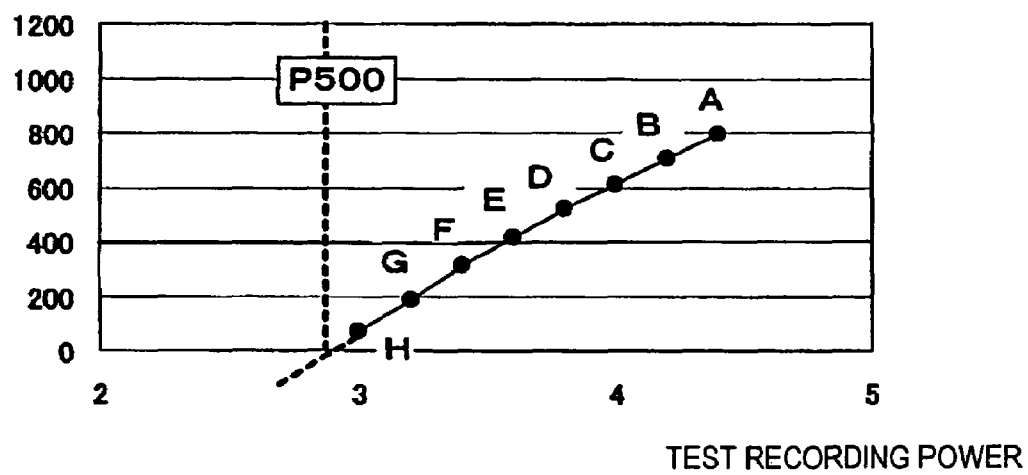
FIG. 14(b) is a graph illustrating the relationship between (i) the test recording power and (ii) the product of the modulation factor and the square of the test recording power.

FIG. 14(b) is a graph illustrating the relationship between (i) the test recording power and (ii) the product of the modulation factor and the square of the test recording power.

Next, referring to S36 of FIG. 13, the calculation section 402 creates an approximate line indicating the correlation between the plurality of test recording powers and the plurality of products, and calculates a recording power P500 at which the product is 0 on the approximate line, as shown in FIG. 14(b).

Then, as shown in S38 of FIG. 13, the calculation section 402 calculates a recording power Pw1 for recording user data based on the recording power P500 in accordance with the following expression 1.

$$Pw1 = P500 \times (-1/\kappa + 2) \times \rho \qquad \text{expression 1}$$

The output section 403 outputs a signal 109 indicating the recording power Pw1 to the recording power setting section 110.

According to this embodiment, the relationship between the modulation factor and the value of Mind is checked, and it is confirmed that the smallest modulation factor is smaller than the value of Mind and that the largest modulation factor is larger than the value of Mind. By this, data is recorded at a test recording power in a range which is close to the range of test recording powers used by the disc manufacturer for determining Pind. Therefore, the recording power recommended by the disc manufacturer can be more accurately obtained.

In the above description, it is confirmed that the smallest modulation factor is smaller than the value of Mind and that the largest modulation factor is larger than the value of Mind. A condition may be added that the smallest test recording power among the plurality of test recording powers is equal to or greater than 0.9 times the recording power at which the modulation factor is substantially equal to the value of Mind. With such a condition, data is recorded at a test recording power in a range closer to the range used by the disc manufacturer for determining Pind. Therefore, the recording power recommended by the disc manufacturer can be still more accurately obtained.

A condition may be added that the largest test recording power among the plurality of test recording powers is equal to or less than 1.1 times the recording power at which the modulation factor is substantially equal to the value of Mind. With such a condition, data is recorded at a test recording power in a range still closer to the range used by the disc manufacturer for determining Pind. Therefore, the recording power recommended by the disc manufacturer can be still more accurately obtained.

Moreover, a condition may be added that the smallest test recording power is equal to or greater than 0.9 times the recording power at which the modulation factor is substantially equal to the value of Mind and the largest test recording power is equal to or less than 1.1 times the recording power at which the modulation factor is substantially equal to the value of Mind. With such a condition, the recording power recommended by the disc manufacturer can be still more accurately obtained.

The margin of the largest test recording power or the smallest test recording power with respect to the recording power at which the modulation factor is equal to the value of Mind does not need to be 10%, as long as data is recorded at a test recording power in a range close to the range used by the disc manufacturer for determining Pind.

As can be appreciated from the graph of FIG. 14(a), formed on the optical disc 101 increases, resulting in an increase in the modulation factor. When the recording power reaches a certain point, the width of the marks is restricted by the width of the track and thus saturates. Accordingly, the modulation factor also saturates. The magnitude of the recording power can be classified into three ranges in terms of the relationship with the modulation factor. In a first range of the recording power, the modulation factor increases with no influence of the width of the track (smaller than the test recording power H). In a second range of the recording power, the modulation factor increases while being influenced by the width of the track (from the test recording power H to the test recording power A). In a third range of the recording power, the modulation factor saturates under the influence of the width of the track (larger than the test recording power A).

As shown in FIG. 14(b), with a recording power within the range from the test recording power A to the test recording power H, the correlation between (i) the test recording power and (ii) the product of the modulation factor and the square of the test recording power exhibits a high linearity. By contrast, with a recording power larger than the test recording power A or a recording power smaller than the test recording power H, the width of the marks is determined by different factors. Therefore, the correlation does not necessarily exhibit a high linearity.

The range between the critical recording power for forming the marks and the test recording power II is very narrow. With a recording power larger than the test recording power A, it is difficult to detect a change in the optimum recording power caused by an external disturbance since the modulation factor saturates. Accordingly, an appropriate range of modulation factor used for determining the recording power is a range in which the modulation factor changes while being influenced by the width of the track.

A recording power is in the range in which the modulation factor increases with no influence of the width of the track in the case where, for example, dust is attached to the optical disc 101 or the optical head 102; an external disturbance such as a relative tilt or defocusing occurs between the optical disc 101 and the optical head 102; or the strength of the optical beam emitted by the optical head 102 is reduced by a temperature change of the optical head 102. A recording power is in the range in which the modulation factor saturates under the influence of the width of the track in the case where, for example, the strength of the optical beam emitted by the optical head 102 is increased by a temperature change of the optical head 102.

In the above description, when the modulation factor corresponding to the test recording power H is larger than the value of Mind, a plurality of test recording powers smaller than the previous test recording powers are set and test data is recorded at the newly set test recording powers. Similarly, when the modulation factor corresponding to the test recording power A is smaller than the value of Mind, a plurality of test recording powers larger than the previous test recording powers are set and test data is recorded at the newly set test recording powers. This embodiment is not limited to this. The recording power may be determined using only a predetermined range of modulation factors with the range of test recording powers being expanded.

However, in order to expand the range of test recording powers, it is necessary either to expand the difference between each adjacent test recording powers or to expand the range used for determining the recording power. The former decreases the precision, and the latter extends the time until the recording power is obtained or wears the area used for determining the recording power unnecessarily quickly. Especially in the case of write-once read-many optical discs on which data cannot be overwritten, it is not preferable to expand the area used for determining the recording power. Accordingly, it is preferable to make a difference between each adjacent test recording powers equal to or less than 10% of the value of Pind, record test data so as to form 8T marks in a recording area equal to or less than one track, and only when the modulation factors are not within a predetermined range, newly set a range of test recording power to record the test data. With this arrangement, the recording power can be determined highly precisely within a short period of time.

As described above, according to the recording power determination method and the recording power determination device of this embodiment, an appropriate recording power can be determined.

Embodiment 4

Hereinafter, Embodiment 4 of a recording, power determination method and a recording power determination device according to the present invention will be described with reference to FIG. 15.

In Embodiment 3, the first recording power is calculated based on the relationship between (i) each of the plurality of test recording powers and (ii) the product of each of the modulation factors and the square of each of the test recording powers. The present invention is not limited to this.

In this embodiment, a case where the value of exponent is 1 will be described.

A recording power determination device 108 of this embodiment has substantially the same structure as that of the recording power determination device described in Embodiment 1 with reference to FIG. 5. An optical disc apparatus 100 including the recording power determination device 108 of this embodiment also has substantially the same structure as that of the optical disc apparatus described in Embodiment 1 with reference to FIG. 2. In order to avoid redundancy, the recording power determination device 108 and the optical disc apparatus 100 of this embodiment will not be described regarding the points which are the same as those of Embodiment 1.

As described above, an optical disc 101 conformed to the BD format has values of Pind, $\rho$, $\kappa$ and Mind stored thereon in a predetermined area. The recording power determination device 108 of this embodiment is substantially the same as the recording power determination device described in Embodiment 3, in that the recording power determination device 108 confirms that the largest modulation factor among the plurality of modulation factors is larger than the value of Mind and that the smallest modulation factor among the plurality of modulation factors is smaller than the value of Mind. Therefore, the recording power determination device 108 of this embodiment will not be described regarding the points which are the same as those of Embodiment 3.

Figure 15A:
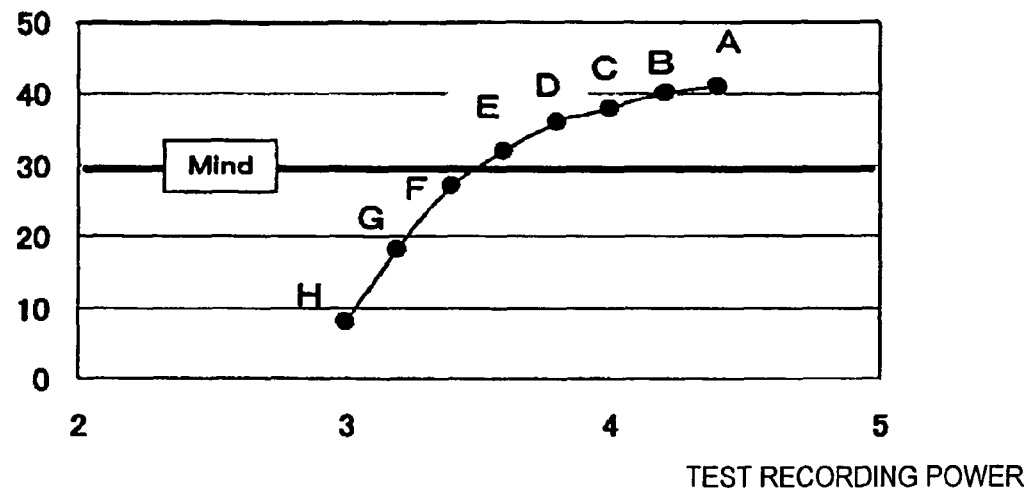
FIG. 15(a) is a graph illustrating the relationship between the test recording power and the modulation factor.

FIG. 15(a) is a graph illustrating the relationship between the test recording power and the modulation factor corresponding to the test recording power. The calculation section 402 of the recording power determination device 108 confirms that the modulation, factor corresponding to the smallest test recording power H is smaller than the value of Mind and that the modulation factor corresponding to the largest test recording power A is larger than the value of Mind as shown in FIG. 15(a).

Next, after confirming that the largest modulation factor is larger than the value of Mind and that the smallest modulation factor is smaller than the value of Mind, the calculation section 402 calculates a product of each of the plurality of modulation factors and each of the plurality of test recording powers.

Figure 15B:
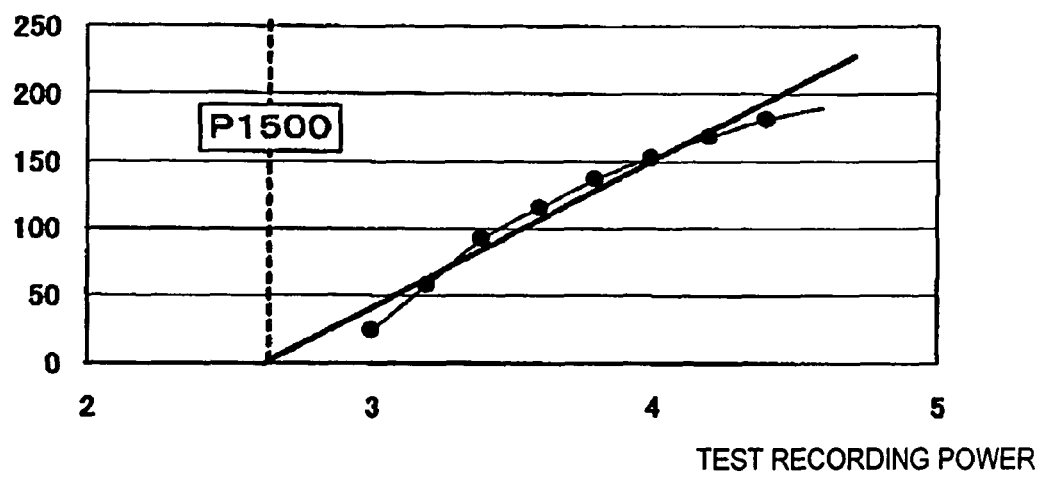
FIG. 15(b) is a graph illustrating the relationship between (i) the test recording power and (ii) the product of the modulation factor and the test recording power.
Figure 16:
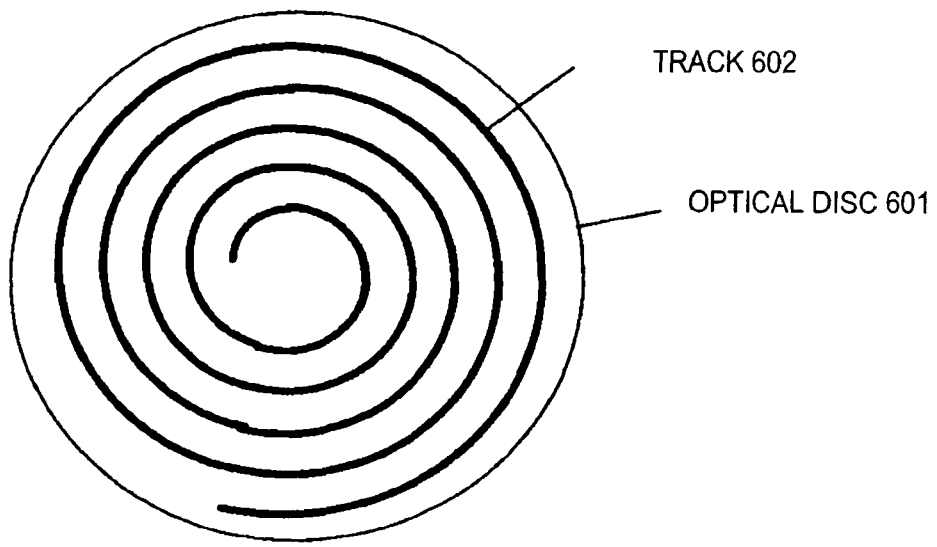
FIG. 16 is a schematic view showing a general optical disc.
Figure 17:
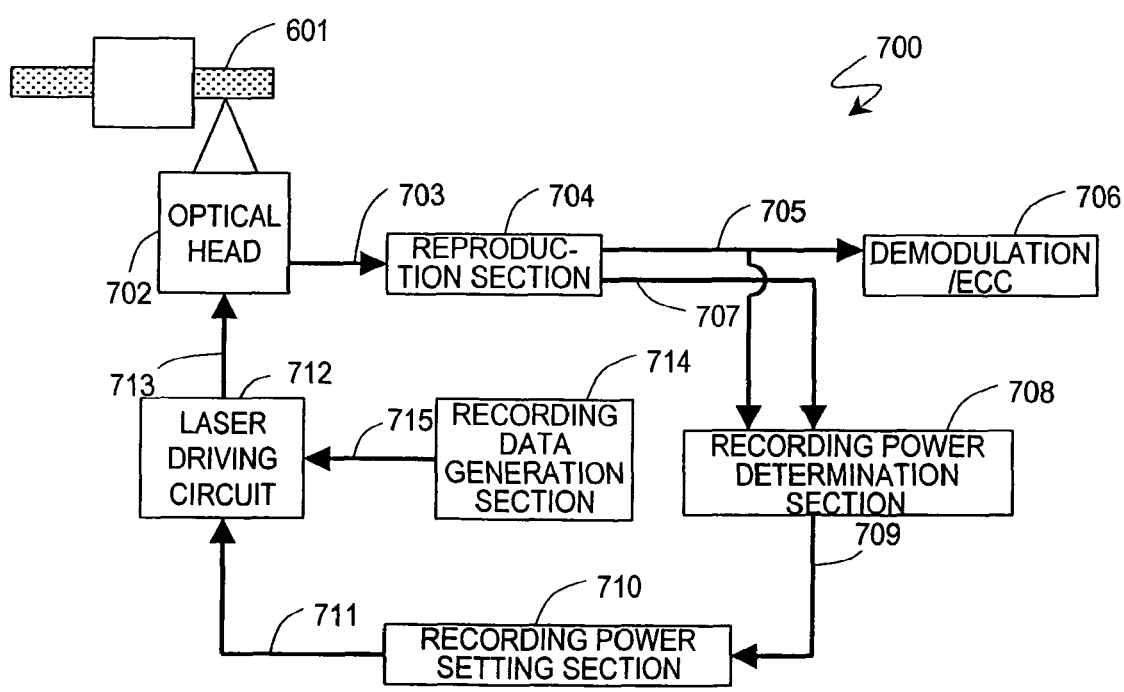
FIG. 17 is a schematic view showing a conventional optical disc apparatus.
Figure 18:
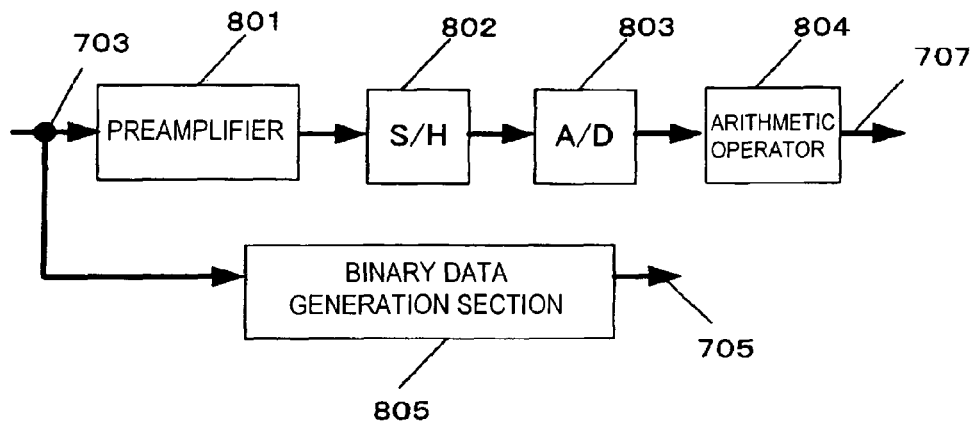
FIG. 18 is a schematic view showing a reproduction section of the conventional optical disc apparatus.
Figure 19:
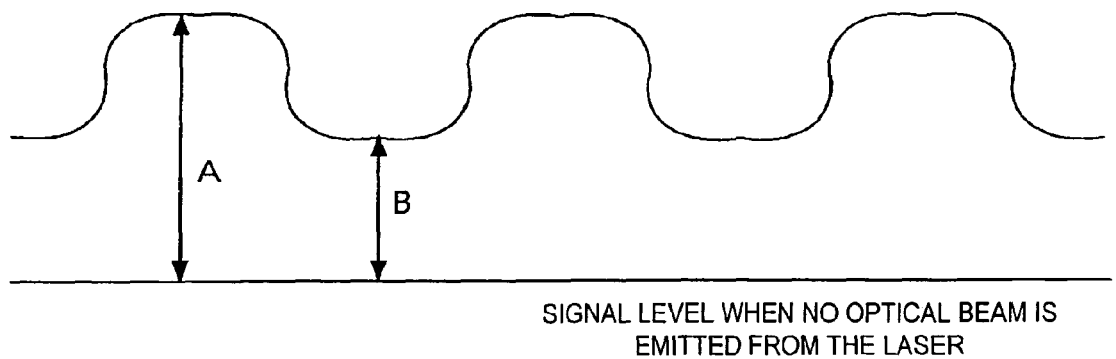
FIG. 19 is a schematic view for describing a modulation factor.
Figure 20:
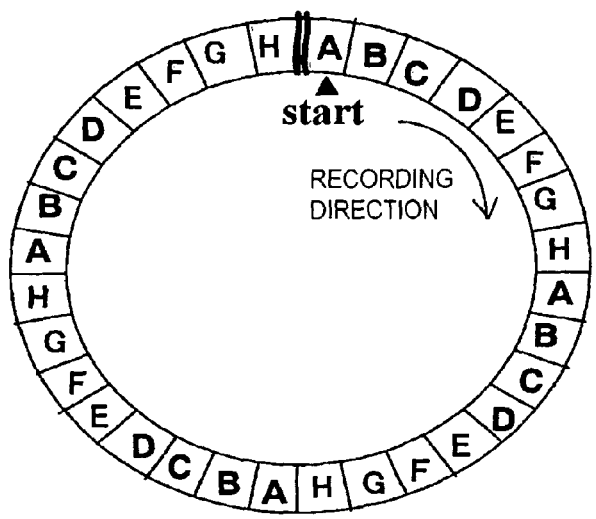
FIG. 20 is a schematic view for describing test data recording performed on an optical disc at a plurality of test recording powers by a conventional recording power determination method.

FIG. 15(b) is a graph illustrating the relationship between (i) the test recording power and (ii) the product of the modulation factor and the test recording power.

As shown FIG. 15(b), the calculation section 402 creates an approximate line indicating the correlation between the plurality of test recording powers and the plurality of products, and calculates a recording power P1500 at which the product is 0 on the approximate line. Then, the calculation section 402 calculates a recording, power Pw1 for recording data in accordance with the following expression 3.

$$Pw1 = P1500 \times \kappa \times \rho \qquad \text{expression 3}$$

According to this embodiment, the relationship between the modulation factor and the value of Mind is checked, and it is confirmed that the smallest modulation factor among the plurality of modulation factors is smaller than the value of Mind and that the largest modulation factor among the plurality of modulation factors is larger than the value of Mind. By this, data is recorded at a test recording power in a range which is close to the range of test recording powers used by the disc manufacturer for determining Pind. Therefore, the recording power recommended by the disc manufacturer can be more accurately obtained.

In the above description, it is confirmed that the smallest modulation factor is smaller than the value of Mind and that the largest modulation factor is larger than the value of Mind. A condition may be added that the smallest test recording power is equal to or greater than 0.9 times the recording power at which the modulation factor is substantially equal to the value of Mind. With such a condition, data is recorded at a test recording power in a range closer to the range used by the disc manufacturer for determining Pind. Therefore, the recording power recommended by the disc manufacturer can be still more accurately obtained.

A condition may be added that the largest test recording power is equal to or less than 1.1 times the recording power at which the modulation factor is substantially equal to the value of Mind. With such a condition, data is recorded at a test recording power in a range closer to the range used by the disc manufacturer for determining Pind. Therefore, the recording power recommended by the disc manufacturer can be still more accurately obtained.

Moreover, a condition may be added that the smallest test recording power is equal to or greater than 0.9 times the recording power at which the modulation factor is substantially equal to the value of Mind and the largest test recording power is equal to or less than 1.1 times the recording power at which the modulation factor is substantially equal to the value of Mind. With such a condition, the recording power recommended by the disc manufacturer can be still more accurately obtained.

The margin of the largest test recording power or the smallest test recording power with respect to the recording power at which the modulation factor is equal to the value of Mind does not need to be 10%, as long as data is recorded at a test recording power in a range close to the range used by the disc manufacturer for determining Pind.

In the case where the value of exponent is 1, as shown in FIG. 15(b), the linearity of the correlation between (i) the test recording power and (ii) the product of the modulation factor and the test recording power may not be as high as the linearity of the correlation in the case where the value of exponent is 2. Due to the difference in the set range of the test recording powers, the value of the recording power Pthr at which the product is 0 may fluctuate slightly. Therefore, in the case where the value of exponent is 1, it is preferable to record data at a test recording power in a range closer to the range used by the disc manufacturer for determining Pind than the range in Embodiment 3. In Embodiment 3, the linearity of the correlation between (i) the test recording power and (ii) the product of the modulation factor and the test recording power is high.

In the above description, when the modulation factor corresponding to the test recording power H is larger than the value of Mind, a plurality of test recording powers smaller than the previous test recording powers are newly set and test data is recorded at the newly set test recording powers. Similarly, when the modulation factor corresponding to the test recording power A is smaller than the value of Mind, a plurality of test recording powers larger than the previous test recording powers are newly set and test data is recorded at the newly set test recording powers. Alternatively, the recording power may be determined using only a predetermined range of modulation factors with the range of test recording powers being expanded.

However, in order to expand the range of test recording powers, it is necessary either to expand the difference between each adjacent test recording powers or to expand the range used for determining the recording power. The former decreases the precision, and the latter extends the time until the recording power is determined. Accordingly, like in Embodiment 3, it is preferable to make a difference between each adjacent test recording powers equal to or less than 10% of the value of Pind, record test data in a recording area equal to or less than one track, and only when the recording power cannot be determined, newly set a range of test recording powers to record the test data. With this arrangement, the recording power can be determined highly precisely within a short period of time.

In Embodiments 3 and 4, the values of exponent are 1 and 2. The value of exponent may be any real number. Embodiments 3 and 4, as described above in Embodiment 2, the value of exponent n may be selected such that the linearity of the correlation between (i) the test recording power and (ii) the product of the modulation factor and the n'th power of the test recording power is high. In this case, since the linearity of the correlation corresponding to the value of exponent n is high, the recording power at which the product is 0 is determined substantially uniquely even if the range of the test recording powers is wide. Therefore, an appropriate recording power can be determined in a shorter period of time. In this case also, it is preferable to record the selected value of exponent n on the optical disc. By recording the value of exponent n on the optical disc, the degree of freedom of the disc manufacturer for designing the recording film can be enhanced.

As described above, in Embodiments 3 and 4, the value of Mind is read from the optical disc 101, and a product of the modulation factor and the n'th power of the recording power is calculated referring to the value of Mind, so that an appropriate recording power for recording data can be determined.

The optical disc apparatus of Embodiments 1 through 4 record data on the optical disc and reproduce data recorded on the optical disc. The present invention is not limited to this. The present invention is applicable to any information recording apparatus for recording data at a plurality of test recording powers before recording data.

In Embodiments 1 through 4, the optical disc is used as an information storage medium. The present invention is not limited to this. The present invention is applicable to any information storage medium for which the recording power is to be determined.

In Embodiments 1 through 4, the data is recorded by the Run Length Limited (1,7) modulation system. The present invention is not limited to this. According to the present invention, other recording systems may be used. In the case where modulation systems other than the Run Length Limited (1,7) modulation system is used, it is preferable to record test data corresponding to a signal indicating a great number of longest marks and longest spaces of the system continuous to each other. According to the present invention, any single cycle signal may be used. In the case where a single cycle signal is used, it is preferable that the amplitude of the signal is about the same as the amplitude of the signal of the longest marks and the longest spaces.

In Embodiments 1 through 4, the peak power (Pp), the bias power (Pe), and the bottom power (Pbw) are common among all the marks, and Tmp is also common among all the marks. The present invention is not limited to this. Other parameters for determining the recording power may be used.

In Embodiments 1 through 4, Ttop, dTtop, and dTe are classified into three classes of 2T, 3T, and 4T or greater. The present invention is not limited to this. Ttop, dTtop, and dTe may be classified by any other method.

In Embodiments 1 through 4, the ratio among the peak power, the bias power and the bottom power is constant. The present invention is not limited to this. The peak power, the bias power and the bottom power may be independently determined. For example, the powers may be separately determined such that the bias power and the bottom power are fixed when determining the peak power.

In Embodiments 1 through 4, test data is recorded at eight test recording powers. The present invention is not limited to this. The present invention is applicable to any case where data is recorded at a plurality of test recording powers.

In Embodiments 1 through 4, the recording power determination device 108 determines the test recording powers A through H in advance. The present invention is not limited to this. The recording power determination device 108 does not need to determine the test recording powers A through H in advance. The recording power setting section 110 may output a signal indicating the test recording powers A through H set in the laser driving circuit 112 to the recording power determination device 108.

In Embodiments 1 through 4, the recording power determination device 108 determines the recording power. The present invention provides substantially the same effect even when the recording power determination device and other peripheral elements are incorporated into an IC.

According to a recording power determination method and a recording power determination device of the present invention, an appropriate recording power can be determined, and therefore data can be property recorded. In addition, an optical disc can be prevented from being, deteriorated unnecessarily quickly. The present invention is especially effective in an optical disc apparatus conformed to the BD format which requires more precise recording power control for higher density recording.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A recording power determination method for determining a recording power of an optical beam for recording data on an information recording medium, the method comprising:

a test data recording step of recording test data on the information recording medium at a plurality of test recording powers;

a modulation factor measuring step of reading the test data recorded at each of the plurality of test recording powers, generating a signal, and measuring a modulation factor of the signal corresponding to each of the plurality of test recording powers;

a product obtaining step of calculating a product of an n'th power of each of the plurality of test recording powers and the modulation factor corresponding thereto, thereby obtaining a plurality of products corresponding to the plurality of test recording powers, where n is a value of exponent and is a real number other than 1;

a first recording power calculating step of calculating a first recording power based on the correlation between the plurality of test recording powers and the plurality of products; and a recording power calculating step of calculating the recording power based on the first recording power, wherein:

the recording power determination method further comprising a value reading step of reading a value recorded on the information recording medium;

the information recording medium has the value of exponent n recorded thereon;

the value reading step includes the step of reading the value of exponent n; and the product obtaining step includes the step of using the read value of exponent n.

* * * * *